United States Patent
Levin et al.

(10) Patent No.: US 9,494,783 B2
(45) Date of Patent: Nov. 15, 2016

(54) COMPACT, HIGH-RESOLUTION FLUORESCENCE AND BRIGHTFIELD MICROSCOPE AND METHODS OF USE

(75) Inventors: Robert K. Levin, San Diego, CA (US); Brian K. Rasnow, Newbury Park, CA (US); Mel Schehlein, Las Vegas, NV (US); Chris Shumate, Carlsbad, CA (US); Walter D. Niles, La Jolla, CA (US)

(73) Assignee: Etaluma Inc., Carlsbad, CA (US)

( * ) Notice: Subject to any disclaimer, the term of this patent is extended or adjusted under 35 U.S.C. 154(b) by 864 days.

(21) Appl. No.: 13/304,084

(22) Filed: Nov. 23, 2011

(65) Prior Publication Data

US 2012/0133756 A1    May 31, 2012

Related U.S. Application Data

(60) Provisional application No. 61/458,696, filed on Nov. 30, 2010.

(51) Int. Cl.
    *G02B 21/00* (2006.01)
    *G02B 21/16* (2006.01)
    *G02B 21/36* (2006.01)

(52) U.S. Cl.
    CPC ........... *G02B 21/16* (2013.01); *G02B 21/0088* (2013.01); *G02B 21/365* (2013.01)

(58) Field of Classification Search
    CPC ..................................... G02B 21/00–21/368
    USPC ................................................ 359/368–398
    See application file for complete search history.

(56) References Cited

U.S. PATENT DOCUMENTS

| | | | | |
|---|---|---|---|---|
| 4,012,111 | A  * | 3/1977 | Masterson | 359/391 |
| 7,102,672 | B1 | 9/2006 | Jacobs | 348/243 |
| 7,297,961 | B2 | 11/2007 | Kang | 250/458.1 |
| 7,599,122 | B2 | 10/2009 | Liao | 359/680 |
| 7,639,420 | B2 | 12/2009 | Yamamoto | 359/368 |
| 7,902,523 | B2 | 3/2011 | Motomura | 250/458.1 |
| 7,903,327 | B2 | 3/2011 | Karaki | 359/368 |
| 8,000,003 | B2 | 8/2011 | Fey | 359/368 |
| 8,279,374 | B2 | 10/2012 | Park et al. | 347/79 |
| 2002/0185610 | A1 * | 12/2002 | Stern | 250/458.1 |
| 2004/0061070 | A1 * | 4/2004 | Hansen | 250/458.1 |
| 2006/0066942 | A1 * | 3/2006 | Kouno et al. | 359/368 |
| 2006/0184037 | A1 * | 8/2006 | Ince et al. | 600/476 |
| 2008/0252966 | A1 * | 10/2008 | Karaki | 359/391 |

(Continued)

OTHER PUBLICATIONS

Berkema, Universal serial bus 3.0 specification, 2011, 1-533 (1 of 4).

(Continued)

*Primary Examiner* — Bumsuk Won
*Assistant Examiner* — Jeffrey Madonna
(74) *Attorney, Agent, or Firm* — Mintz Levin Cohn Ferris Glovsky and Popeo, P.C.

(57) ABSTRACT

The present invention provides a compact, inexpensive fluorescence microscope capable of high-resolution imaging with high light throughput suitable for use in both laboratory and field environments, and methods of use. A simple and inexpensive fluorescence microscope allows health care workers to perform various medical assays at the point of care instead of having to collect and transport biological samples to distant labs, and subsequently return the results to the patient. The microscope of the present invention is also useful for educational use and field use, and other uses as well.

30 Claims, 18 Drawing Sheets

(56) References Cited

U.S. PATENT DOCUMENTS

| | | | | |
|---|---|---|---|---|
| 2009/0046358 | A1* | 2/2009 | Shimada | G02B 21/16 359/381 |
| 2009/0086314 | A1* | 4/2009 | Namba | G01N 21/6458 359/383 |
| 2009/0141126 | A1* | 6/2009 | Soenksen | 348/79 |
| 2009/0225410 | A1* | 9/2009 | Fey | G02B 21/16 359/385 |
| 2009/0303582 | A1* | 12/2009 | Karasawa | G02B 21/365 359/363 |
| 2010/0014158 | A1* | 1/2010 | Nihoshi | 359/388 |
| 2011/0101203 | A1* | 5/2011 | Cooper | G02B 21/245 250/201.4 |
| 2011/0134521 | A1* | 6/2011 | Truong | G01N 21/6408 359/388 |
| 2011/0194174 | A1* | 8/2011 | Laudo | B01L 9/06 359/385 |
| 2011/0249137 | A1* | 10/2011 | Suzuki | G01N 21/6428 348/222.1 |
| 2012/0092477 | A1* | 4/2012 | Kawano et al. | 348/79 |
| 2012/0287244 | A1* | 11/2012 | Bennett | G01N 21/6458 348/46 |

OTHER PUBLICATIONS

Berkema, Universal serial bus 3.0 specification, 2011, 1-533 (2 of 4).

Berkema, Universal serial bus 3.0 specification, 2011, 1-533 (3 of 4).

Berkema, Universal serial bus 3.0 specification, 2011, 1-533 (4 of 4).

U.S. Appl. No. 61/458,696, filed Nov. 30, 2010, Levin.

Quericoli, Fluorescence Microscopy, in Optical Fluorescence Microscopy, in From the Spectral to the Nano Dimension, ed. Diaspro 2011, Springer, pp. 1-36.

Kahle, An inexpensive simple-to-use inverted fluorescence microscope: A New tool for cellular analysis, 2011, Journal of Laboratory Automation 15, 355-361.

Heo, Characterizing cutaneous elastic fibers by eosin fluorescence detected by fluorescence microscopy, 2011, Ann Dermatol, 23: 44-52.

Martin, Light emitting diode microscope illumination for green fluorescent protein or fluorescein isothiocyanate epifluorescence, 2005, Biotechniques 38:204-206.

Fossum, CMOS image sensors: electronic camera-on-a-chip, 1997, IEEE Trans Electron Devices 44 :1689-1698.

Cheng, A CMOS image sensor with dark-current cancellation and dynamic sensitivity operations, 2003, IEEE Trans Electron Devices 50, 91-95.

Berkema, Universal serial bus 3.0 specification, 2011, 1-533.

Wang, A study of CMOS technologies for image sensor applications. Thesis, Massachusetts Institute of Technology, 2008, 1-96.

Burghartz, HDR CMOS imagers and their applications, 2006, Proceedings of the International Conferences on Solid State and Integrated Circuits Technology 1, 6-9.

Yang, Characterization of CMOS image sensors with Nyquist rate pixel level ADC, in Selected Papers on CCD and CMOS Imagers, ed. M.G. Kang, SPIE Press, 2003, 292-303.

Kahle, Applications of a compact, easy-to-use inverted fluorescence microscope, 2011, American Laboratory, http://www.americanlaboratory.com/914-Application-Notes/35882-Applications-of-a-Compact-Easy-to-Use-Inverted-Fluorescence-Microscope/.

Shumate, A simple CMOS-based USB inverted fluorescence microscope: A new tool for laboratory automation, abstract submitted to The Society for Laboratory Automation, Jan. 30, 2010.

Rasnow, An inexpensive CMOS- and USB-based inverted fluorescence microscope for exploring optics, physics, and biology at a smaller scale, abstract presented to the American Association of Physics Teachers, Jul. 21, 2010.

Kahle, Lumascope™, an inexpensive, sturdy USB-based inverted fluorescence microscope, abstract submitted to the Society for Neuroscience, Nov. 11, 2010.

Rasnow, A radically inexpensive CMOS- and USB-based inverted fluorescence microscope, abstract to the IEEE—Engineering in Medicine and Biology Society, Jan. 26, 2011.

* cited by examiner

COMPACT, HIGH-RESOLUTION FLUORESCENCE AND BRIGHTFIELD MICROSCOPE AND METHODS OF USE

The present application claims benefit of priority to U.S. Provisional Application No. 61/458,696, filed on Nov. 30, 2010, entitled "Compact, High-Resolution Fluorescence Microscope," which is incorporated by reference in its entirety.

TECHNICAL FIELD

The present invention generally relates to a digital inverted or upright fluorescence microscope having excitation, emission, and imaging optics and sensor integrated into a short light path in a single compact assembly for high resolution, and using a CMOS sensor for image acquisition and control of image display on an electronic device without need for an ocular assembly.

BACKGROUND

Fluorescence and brightfield microscopes have become indispensable tools for science and medicine. Traditional laboratory microscopes with photo capabilities needed for research and medical diagnostics are large, cumbersome, fragile, and expensive to the extent that they are priced out of reach for many potential users, including science teachers. Accordingly, many researchers, clinicians, and educators lack access to microscopes for their work. Furthermore, many microscopes are complicated to use and maintain, which hinders their use in many applications.

Schools struggle with modern conventional microscopes. They are foreign and intimidating to many students. Their complicated operation results in frequent difficulties such as misalignment, inappropriate interocular distances, incorrect condenser focus, and damaged or dirty objective lenses, in some cases due to the physical inaccessibility of these parts to the user. In many classrooms, the number of students easily exceeds the ability of a teacher to assist and verify what the students are or are not seeing. Because of these difficulties, teachers have resorted to using sophisticated microscope simulations since microscopy is such an important component of the modern curriculum (http://virtualurchin.stanford.edu/microtutorial.htm).

Many modern disease diagnostic assays utilize fluorescence, whether intrinsic to the sample, provided by the binding of a fluorescent molecule or an antibody labeled with a fluorescent moiety specific to a disease epitope, indirect immunofluorescence, or in situ hybridization of a fluorescently labeled nucleic acid sequence to a genetic marker of disease, among other diagnostic approaches. These diagnostic assays are limited in their availability to parts of the world where the deleterious impact of these diseases is greatest, due in part to the operational complexity and expense of fluorescence microscopes. Malaria infects an estimated 225 million people worldwide, yet many more cases may remain undiagnosed. During its lifecycle, the parasite dwells within the confines of red blood cells where it can be observed in a blood smear with suitable contrast enhancement or, because red cells contain no chromosomes, with a simple membrane-permeant fluorescent dye that intercalates and stains DNA. Yet due to the expense and cumbersome nature of modern fluorescence microscopes, these simple diagnostic tests are not being performed at locations where they are needed.

We describe a highly economical and compact inverted fluorescence microscope system, incorporating a brightfield and oblique transmission imaging mode and having a simple, yet robust design, with broad applications in research, science education, and point-of-care medicine to address these unmet needs.

SUMMARY

Figure 1A:
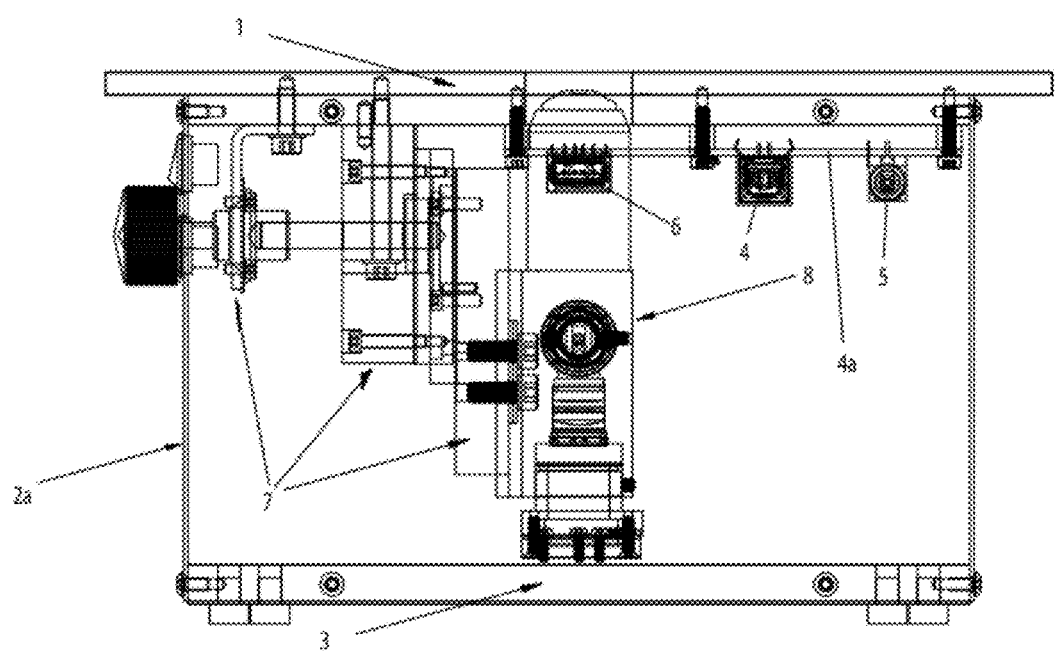
FIG. 1A depicts a rear cross-sectional view of the layout of a compact high-resolution fluorescence microscope of the present invention.

The present invention recognizes the need for a compact, inexpensive fluorescence microscope capable of high-resolution imaging with high light throughput suitable for use in laboratory and field environments.

A first aspect of the present invention is an inverted fluorescence microscope.

A second aspect of the present invention is a method of using an inverted fluorescence microscope of the present invention.

DETAILED DESCRIPTION OF THE INVENTION

Definitions

Unless defined otherwise, all technical and scientific terms used herein have the same meaning as commonly understood by one of ordinary skill in the art to which this invention belongs. Generally, the nomenclature used herein are well known and commonly employed in the art. Where a term is provided in the singular, the inventors also contemplate the plural of that term. The nomenclature used herein and the procedures described below are those well known and commonly employed in the art.

Introduction

The present invention recognizes the need for a compact, inexpensive microscope capable of high-resolution imaging with high light throughput suitable for use in laboratory and field environments.

As a non-limiting introduction to the breath of the present invention, the present invention includes several general and useful aspects, including:

1) an inverted fluorescence microscope including a stage for placing a sample for observation and a compact, integrated epifluorescence illumination and detection system; and
2) a method of using an inverted fluorescence microscope of the present invention.

These aspects of the present invention, as well as others described herein, can be achieved by using the methods, articles of manufacture and compositions of the matter described herein. To gain a full appreciation of the scope of the present invention, it will be further recognized that various aspects of the present invention can be combined to make desirable embodiments of the present invention.

I. An Inverted Fluorescence Microscope

The present invention includes an inverted fluorescence microscope including a stage for placing a sample for observation and a compact, integrated epifluorescence illumination and detection system.

In the present invention, a single-assembly light path directs excitation illumination from a miniaturized source to a sample and focuses the resulting fluorescence image onto an integrated CMOS (complementary metal-oxide-semiconductor) active-pixel sensor. Image data is transmitted from the sensor to a host computer or other electronic device by a standard universal serial bus (USB) for observation on a display screen. The present invention is unique in its design, unlike existing fluorescence microscope, enabling broad utility in research, diagnostics, and education.

The low light-loss imaging assembly includes one or more of the following:

1) an objective lens system for focusing the image of the sample on the sensor;
2) an excitation light source;
3) filters for selecting one or more wavebands of excitation light, for directing said light to the sample, and for selecting one or more wavebands of light emitted by the sample;
4) tube or projection lenses; and
5) an electronic imaging sensor.

The sensor is arranged in a compact manner in a single assembly without reflecting mirrors to decrease internal reflection, maximize light throughput, and enable formation of a high-resolution image. The integrated CMOS sensor has analog and digital signal and image processing functions integrated with the active pixel array onto a single fabricated semiconductor wafer, enabling facile control of image acquisition and post-acquisition processing under computer direction through a fast, standard communication bus, such as USB. The imaging assembly is mounted to the sample stage via a focusing mechanism also mounted to an enclosure or chassis on which said stage is mounted, such that an optical axis is mechanically defined and pinned at multiple fulcrum points, to provide exceptional stability of the image on the sensor and resistance to vibration and other mechanical shock.

Wide-field fluorescence microscopes in common use obtain high resolution images with long and complex light paths in which excitation light directed to the sample and light emitted or scattered by the sample are directed to their intended targets by the use of multiple reflecting or refracting surfaces (for example, U.S. Pat. No. 7,639,420). In addition, multiple compound lenses containing numerous elements to correct spherical and chromatic aberrations are used to obtain high-resolution images of the sample. However, light intensities in the sample attenuate with the inverse square of the distance, and each reflecting or refracting surface in an optical path decreases light throughput in the optical system, such that fluorescent samples emitting weak light intensities may not be detected because insufficient light reaches the detector, whether the eye or a camera. The present invention surmounts this shortcoming by focusing on the more important optical elements of the fluorescence microscope and placing them on the shortest, direct optical path between sample and sensor. Optionally removing from a fluorescence microscope the optical interface to an eye— the ocular eyepiece—enables the construction of vastly smaller, simpler, cheaper, more robust, and more sensitive microscopes.

Another aspect addressed by the invention is the electronic sensor used to record the fluorescence image of the sample. The literature reports that the need for eyepieces can be reduced by the use of a digital imager (see, for example, U.S. Pat. No. 7,599,122) such as CCD (charged coupled device) or standard CMOS pixel arrays. CCD and standard CMOS cameras have relatively large power requirements for control circuitry, external to the pixel array, preferably to time image acquisition, clock light-induced pixel charge out of the array, convert the analog voltage signal of each pixel to a digital value, and format the imaging array data for computer displays and other camera functions. These functions, preferable for the operation of the array as a camera, are bulky and result in a relatively large camera container, because they cannot reasonably be integrated onto the semiconductor wafer on which the CCD or standard CMOS array is fabricated. This container is typically mounted into the microscope platform, resulting in the need for steering the image to the camera port, requiring additional optical lensing elements to achieve a focused image. In addition, the external circuitry generates significant heat, which increases the dark thermal noise of the CCD or CMOS array. Even when this heat is dissipated by a radiator or fan, achievement of an acceptable noise level often requires additional cooling of the imaging array. Furthermore, CCD cameras have a tendency to bloom or create streaking artifacts if too much charge is deposited in their pixels. Larger pixels of the CCD, 10 to 13 µm linear dimension, offer greater dynamic range, but come at greater cost of silicon, and also require higher magnification of the optical system. In contrast, integrated CMOS imaging detectors are not prone to blooming because they do not employ a "bucket brigade" algorithm to transfer charge to the readout amplifier. Instead, each active pixel element is read out through its own individual amplifier. Their pixels can be made smaller, to the range of 2 to 3 µm, and thus lower optical magnification is required to achieve higher image magnifications. The decreased pixel size decreases the noise charge accumulated in the dark. Moreover, a side channel FET, integrated into each active pixel element, removes thermal charge accumulating in said element during the dark, when an image is not being captured, to keep the noise low, thus eliminating the need for cooling (see, for example, U.S. Pat. No. 7,102,672). The present invention obviates these difficulties by the use of an integrated CMOS instead of standard CMOS imager. The integrated CMOS imaging sensor has a high dynamic range active pixel array in which image control functionality and dark charge control are integrated monolithically on the imaging array wafer, resulting in a very small, fully functional image sensor package, in other words, a complete camera on a chip.

Another aspect addressed by the invention is means of control of the electronic sensor and, hence the resulting image. External clocking and timing, acquisition control, digital signal processing, and image formatting functions in CCD or simple CMOS cameras cannot reasonably be integrated onto the pixel array semiconductor, and instead are optionally present as separate device elements connected to the array by external connectors. This invention takes advantage of the placement of clocking and timing, image acquisition and formatting, digital signal processing, and system control functions into circuits within the physical package of the integrated CMOS imaging array, such that power consumption is greatly reduced, the physical size of the container is drastically decreased, and image sensor functionality is increased, enabling greater control of the resulting fluorescence image. The invention realizes these advantages of the integrated CMOS imaging sensor by making further use of the USB data communication standard for system control at the register level on the integrated CMOS sensor by the host computer, and for formatting and transferring imaging data to same for display. This allows direct control of functions determining image quality, such as signal gain, exposure time, output image frame rate, as well as switching to automated control modes, in which internal system control algorithms are used to set gain and exposure to enable mapping the intensity range of the image to the dynamic range of the active pixel array.

The technical challenge of the invention may be attained in accordance with the invention by providing a microscope comprising a horizontal stage for placement of a sample to be observed through an observation hole, with the stage serving as the top surface of the microscope enclosure. The essential elements of the fluorescence microscope are mounted on a single fixture, the imager tube, located below the observation hole inside the microscope container. These elements include an objective lens mounted to the top surface of the fixture such that its optical axis is oriented perpendicular to the plane of the stage and its field of view is centered at the center of the observation hole, a dichroic filter mounted below the objective at a 45° angle to the optical axis, and an illumination tube mounted to the fixture in a position so as to direct light toward the dichroic filter in a direction perpendicular to the optical axis. The illumination tube contains a light source, which in a preferred embodiment is a light-emitting diode (LED) mounted to a miniature power-conditioning circuit, a series of condenser lenses, which allows control of vergence of the excitation light on the sample, and an excitation barrier filter, which selects one or more wavebands of light in ranges of wavelengths less than the cut-on transmission wavelength of the dichroic filter. The axis of the illuminating light is oriented at a 90° angle with respect to the optical axis defined by the objective, such that the dichroic filter reflects the selected excitation light to the sample on the stage at the center of the field of view. The emission barrier, multiple-barrier, or long-pass filter is mounted to the fixture below the dichroic mirror to select desired wavelengths of fluorescence emitted by the sample for observation. A series of projection lenses mounted in tandem below the emission filter serve to focus this selected fluorescence on the image sensor.

In a preferred embodiment of the invention, the imager tube assembly is mounted to a focusing mechanism that is in turn mounted to the chassis of the container. The image of the sample is focused on the sensor by adjusting the vertical distance between the objective lens entrance pupil and the sample. The chassis mounting resists vibrations that degrade image quality and improves resolution of the image.

In an alternate embodiment, the focusing mechanism can control the stage. The focusing mechanism can be mechanically connected to a human interface device such as a knob, or it can use an electromechanical mechanism controlled through an electronic user interface.

In a preferred embodiment, the image sensor is a high-density array of wide dynamic range active CMOS pixels monolithic with a set of analog and digital control and processing circuitry embedded on the same semiconductor wafer. The integrated CMOS sensor enables the image detector to be compact and economical without circuit boards and processors located on platforms external to the sensor wafer, which greatly improves functionality and decreases power requirements, which decreases the dark noise of the imaging pixels and enables detection of low levels of light.

In a further aspect of this preferred embodiment, the control and processing circuitry of the image sensor is interfaced to a computer by a Universal Serial Bus. The bus allows communication between the sensor and host computer. The image sensor is programmed by the host computer to acquire and format the image data in a manner compatible for display on the computer monitor by this bus. The standard communication format enables the sensor to be programmed to control image acquisition by the integrated CMOS active pixel array, and to control processing of the acquired image under direction by the user. Other standard computer interfaces, such as Ethernet, can embody the same functionality.

In a further aspect of the preferred embodiment, a manual or automated x-y caliper is mounted to the sample stage, to enable the sample to be fixed in horizontal dimension for clamping the sample in the field of view and to enable controlled surveying of the sample at specific locations.

In a further aspect of the preferred embodiment, a brightfield illumination source is attached to the external surface of the container to allow transmission illumination of the sample for location of regions of interest to be placed within the field of view, and to enable adjustment of the plane of focus within the sample.

In a further aspect of the preferred embodiment, the USB connection provides power from the host computer to the sensor, the fluorescence light source, the external brightfield light source, and other useful parts of the microscope.

This arrangement reduces light losses by elimination of reflective elements normally used to steer light in other microscope designs. The microscope does not use oculars or eyepieces for focusing or observation, but instead relies on an integrated CMOS active pixel imaging array to produce a digital image displayed in real time on a computer. The imaging array controls image acquisition on the sensor without the need for external circuitry, which enables significant processing of the image before transmission to the computer. The microscope eliminates the need for refractive index matching or adjustment typically needed for high-resolution high-magnification imaging.

Figure 1B:
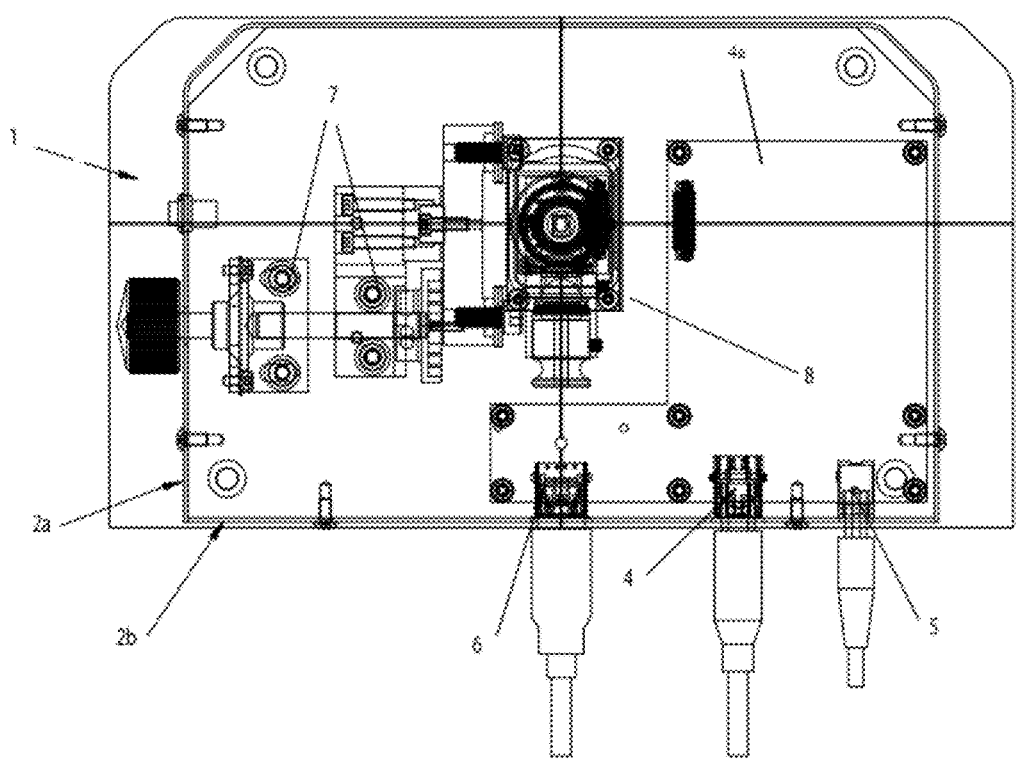
FIG. 1B depicts a top cross-sectional view of a compact high-resolution fluorescence microscope of the present invention.

FIG. 1A and FIG. 1B show respectively a rear and top external perspective of the layout of a preferred embodiment of the inverted microscope. The container comprises a sample stage (1) sitting atop an enclosure defined by the main unit case 2a and rear cover 2b. The stage (1) is an anodized aluminum or other metal or stiff material fabricated to an end-to-end flatness of ≤0.06 mm. The bottom half of the stage is fabricated in a manner to create an understage that extends below the top surface of the enclosure to rest within the footprint of the enclosure. The edges of the top surface of the stage extending beyond the understage may extend beyond the horizontal footprint of the container. This overhang enables large samples, such as cell and tissue culture flasks, to be supported in a stable manner on the stage. The understage portion of stage (1) is machined to dimensions identical to the horizontal footprint defined by the main unit case 2a and rear cover 2b. The stage (1) is attached to the enclosure by screws through holes in main unit case 2a and rear cover 2b where they overlap the rim of the understage portion. These attachments mount stage (1) firmly to the enclosure and minimize vibrations and bending and other motions that could cause instability of the image on the sensor.

Base (3) is a metal or other stiff material plate machined to substantial flatness, with plastic or rubber feet to enable the container to sit flat on a table, bench, or other working surface. The enclosure is mounted to base (3) by screws at the bottom of the container manner such that the top surface of stage (1) is horizontal within ±0.2 mm. These arrangements of the external layout of the inverted microscope provide a stable platform for optical observation of sample with minimum vibration Electrical connections to the microscope are made by connectors mounted in holes through the enclosure. These connections include the USB connection for the sensor (4), the connection from the power supply for the fluorescence illumination (5), the connection for the brightfield illumination source (6), and connections for other functions. Connections 5 and 6 may be used when it is not desired to obtain power for the fluorescence and brightfield illumination sources from the USB connection. In addition, switches for brightfield and fluorescence illuminators are mounted on the enclosure to enable independent actuation of each mode of illumination.

The outer surface of the enclosure, main unit case 2a and rear cover 2b, may be painted or otherwise covered with a material having pleasing appearance, such that brands or other labels may be attached to provide the user with information of interest or need.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Internal Layout of Microscope Components

Figure 2A:
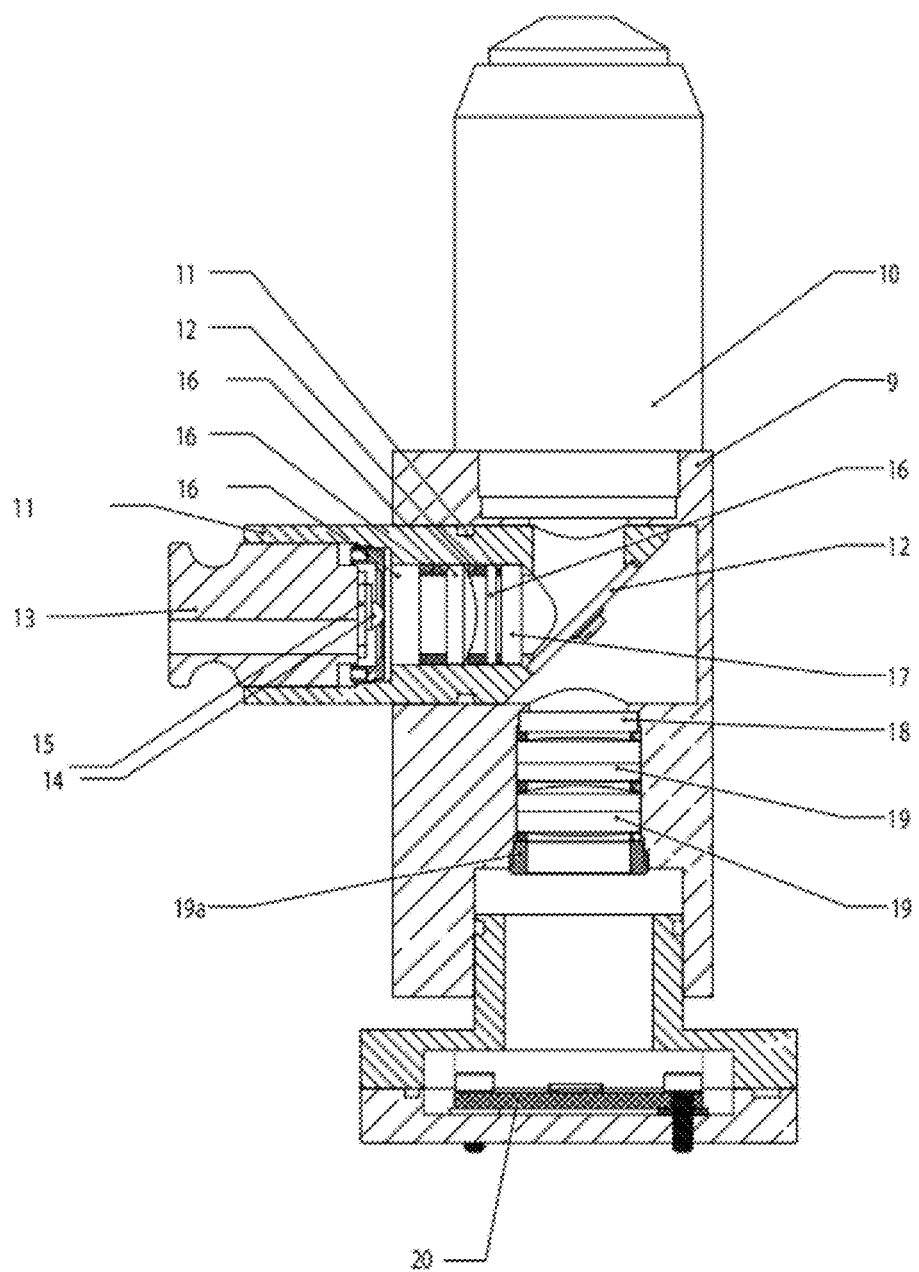
FIG. 2A depicts a cross-sectional view of an optical imager assembly of a compact high-resolution fluorescence microscope of the present invention.
Figure 2B:
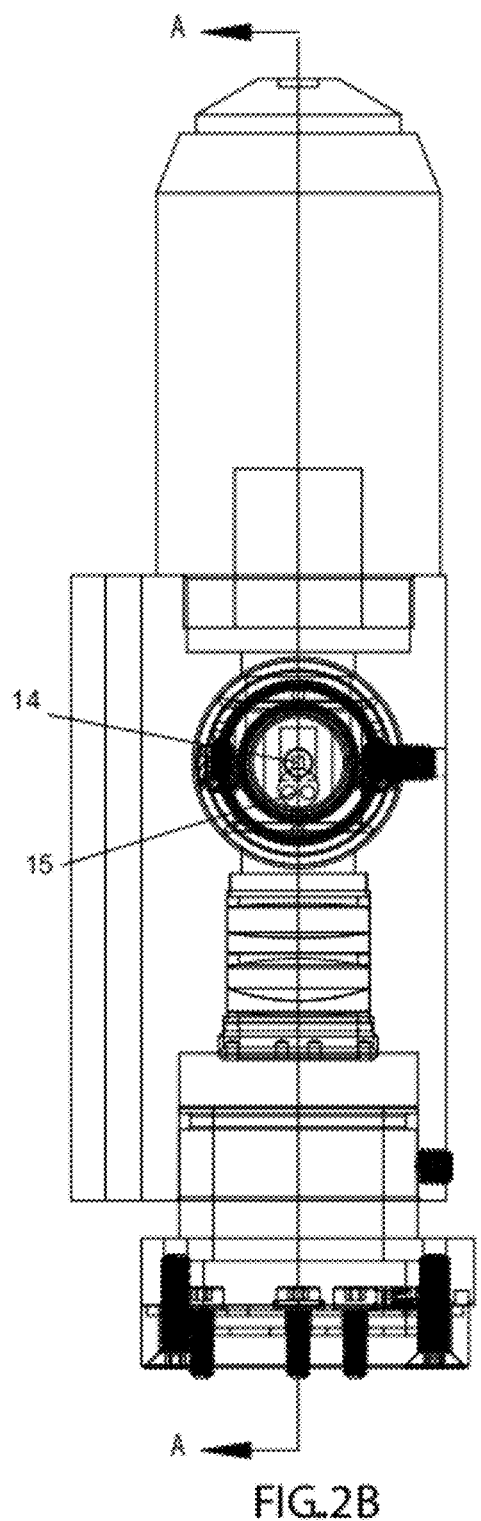
FIG. 2B depicts another cross sectional view of an optical imager assembly of a compact high-resolution fluorescence microscope of the present invention.

Referring again to FIG. 1A and FIG. 1B, the general internal layout of components in a preferred embodiment of the inverted microscope is shown. In this preferred embodiment, the focusing assembly (7) is mounted to the bottom of the stage at two or more distinct horizontal locations to establish a horizontal axis for focusing motions. As is described further in "Focusing assembly", this enables provision of a stable mechanical axis for lifting and lowering the optical imaging assembly (8) in the motions required for focusing the image of the sample on the sensor. In the preferred embodiment, the optical imaging assembly (8) is mounted to the focusing assembly (7) to enable focusing while preserving mechanical stability Optical Imager Assembly: Imager Tube and Objective Referring to FIG. 2A and FIG. 2B, the optical imager assembly is built with an imager tube (9), to which other components of the assembly are mounted. The objective lens (10) is mounted to the hole through the top of the image tube (9) with sides of the hole machined to the same screw thread size as on the base of the objective lens housing to secure a tight fit. The objective lens is positioned below the circular observation hole cut through the stage (1).

In the preferred embodiment, a wide variety of objective lenses may be used. One optional criterion is that the lenses are fabricated from non-fluorescent materials, such as fused silica, quartz, or calcite, to decrease the intrinsic autofluorescence of the microscope. They may be compound lenses designed with finite tube lengths, and the dimensions of the optical imaging assembly are designed to accommodate 160 mm tube lengths, the industrial standard. Alternatively, the lenses may be infinity-corrected assemblies, in which case projection lenses are inserted in the imager tube to enable the sample image to be focused on the image sensor. Many different objective lenses manufactured with standard microscope mounting screw threads can be used in the inverted microscope. Representative, but not exclusive example of such lenses include the Plan 40X 0.65 NA 0.5 mm working distance, Plan 20X 0.4 NA 7.3 mm working distance, and Plan 10X 0.25 NA 7.5 mm working distance objectives (Meiji Techno, Japan), although many other lenses, including video camera lenses and have been used and found suitable.

In an alternative embodiment, further cost and size reductions are possible by using simple infinity-corrected lenses designed for webcams and low-magnification applications. Because of the small (2-5 micron) pixel dimensions of integrated CMOS imaging sensors, optical magnification greater than 5-10× will exceed the diffraction limit and add no further resolution to the image. Such low magnifications may be achieved with simpler lenses than microscope objectives. Low magnification lenses may perform better in the microscope by inverting them front-to-back.

In the preferred embodiment, the diameter of the observation hole is at least 1 mm greater than the outermost diameter of the objective lens housing to enable unimpeded motion of the objective housing during focusing through the stage 1, and to enable removal of an objective lens when changing said lenses.

Optical Imager Assembly: Fluorescence Filters and Epi-Illumination

Below the objective lens, a hole is machined through the side of imager tube to accept the filter tube (11). The sides of this hole are smooth such that the filter tube is correctly positioned and mounted to the tube by the tightness of the press fit and by a retaining screw. The filter tube (11) is centered in the hole by a surrounding o-ring. The end of the filter tube sitting in the space below the objective is machined to a 45° angle with respect to the optical axis defined by the central axis of the objective (axis A in FIG. 2B) and the central longitudinal axis of the filter tube (11). The mounting arrangement described enables this end to be positioned in this prescribed manner. The dichroic filter (12) is mounted to this 45° angle surface by the use of two retaining screws with washers in two holes flanking the outer edges of the dichroic filter (12). Flock paper inserted on the top and bottom surfaces of the dichroic filter (12) where the washers contact the filter are used to enable a compression mounting of the filter without damage to the glass. The dichroic filter is selected so as to allow the desired wavelengths of light emanating from the epi-illumination light source to be reflected to the sample through the objective lens so as to excite the fluorophores in the sample, yet also to allow the wavelengths of light emitted by said fluorophores to be transmitted through the dichroic filter.

The end of the filter tube (11) protruding from the imager tube (9) is machined to accommodate the epi-illumination system (13). The epi-illumination system is also configured as a cylindrical tube that is accepted into a counter-bored hole in the filter tube and centered and positioned in place with retaining screws through the filter tube. The illumination tube holds the epi-illumination light source (14) at the internal end of the tube. In the preferred embodiment, the light source is a light-emitting diode (LED), such as a LUXEON Rebel (Philips Lumileds Lighting Co., San Jose, Calif.) with an emission spectrum providing significant luminance at the excitation wavelength(s) of the fluorophore(s) of interest in the sample. Behind the light source is the miniaturized circuit board (15) containing the current-voltage control apparatus for powering and gating the light source output. The circuit board is connected to the connector for the fluorescence illumination (5) in FIG. 1A and FIG. 1B by leads that, in the preferred embodiment, are connected to a manual switch located in the main unit case 2a for powering the light source on and off.

The epi-illumination from the light source is collimated or focused on the sample by reflection from the dichroic mirror and passing through the objective lens. To achieve greater control of the degree of vergence of the epi-illuminating light upon the sample, a condenser optical circuit (16) comprising one or more lenses of the desired front and back curvatures and intervening spacers is interposed between the light source and the end of the filter tube (11) internal to the optical imager unit (9). This optical circuit is composed of lenses separated by spacers and assembled as a stack before insertion into the filter tube (11) side hole. The first element of the stack is the excitation filter (17), which is a single or multiple band pass interference filter that is tuned to transmit the desired wavelength(s) of light present in the illumination from the light source to excite the fluorophores in the sample. The arrangement allows the condenser optical circuit (16) to absorb undesired heat from the light source, if present, before the excitation wavelengths are selected by the excitation filter (17).

In an alternate embodiment of the invention, the light source in the epi-illumination system 13 is a laser diode that emits one or more wavelengths of light overlapping the excitation spectrum or spectra of the fluorophore or fluorophores in the sample. In this embodiment, the excitation filter (17) can be removed to increase the intensity of epi-illumination at the sample.

In the preferred embodiment, the emission filter (18) is located below the dichroic filter in the imager tube (9) in a counter-bored cut-out of the imager tube. The emission filter (18) faces the dichroic filter and the back end of the objective. The emission filter is selected to pass optimally the waveband(s) of light emitted by the fluorophore(s) in the sample without transmission of the excitation. Below the emission filter are projection lenses (19) inserted into a stack when infinity-corrected objectives are used. The entire stack of projection lenses (19) and emission filter (18) are fixtured in the imager tube by retention nut (19a). The imager tube at the emission filter-projection lens is threaded along its length, such that when finite-tube objectives are used, and the projections lenses are not present, the nut snugly seats the emission filter (18) into the hunger tube.

Optical Imager Assembly: Image Sensor

The image sensor (20) is arranged below the projection lens assembly in the direction of sample side to image side to receive an image of the sample focused by the objective lens and projection lenses, and converts the optical signal into an electronic signal. In a preferred embodiment, the image sensor (20) is mounted to a circuit board that is mounted to the bottom surface of the imager tube (9). In another aspect of the preferred embodiment, the image sensor (20) is an integrated high performance, low-voltage CMOS imaging active pixel array in which functional elements for timing and control of image acquisition and readout of the resulting electronic image are embedded monolithically within the circuitry of the semiconductor wafer on which the imaging pixel array is created. These functional elements include row addressing, column sample and hold, an amplifier for each pixel with gain control, analog-to-digital conversion, black level calibration, digital signal processing, image formatting for computer display compatibility, image output, registers for system control, registers for interface control, and an internal timing generator such as a phase-locked loop. The circuit board on which the wafer is mounted contains circuit elements for input/output control and voltage regulation in a compact package that seats within the diameter of the imager tube (9). Suitable image sensors include CMOS imager chips used in digital cameras, webcams, and cellular telephones, such as the 9712, 9715, and 6552 (Omnivision Technologies, Sunnyvale, Calif.) as well as others.

In a preferred embodiment of the invention, the image sensor communicates with the host computer by a USB version 2.0 bus. A multiple-lead electrical cable connects the circuit board of image sensor 20 to a USB bridge located within the enclosure (FIG. 1A and FIG. 1B). The USB bridge, in turn, is connected to the USB connector 4 located on the main unit cover 2a (FIG. 1A and FIG. 1B). The USB bus is used to configure the image sensor registers, to provide an external clock for image acquisition and readout, to establish timing parameters necessary for reading out the image data in a computer-compatible format, to encode the image data into a display format, such as display resolution (e.g., 640×400 pixels SVGA, 1280×800 pixels WXGA format, or greater resolution formats), to establish the rate at which formatted image frames are read out of the sensor, to choose automatic or manual gain and exposure of image acquisition by the sensor, to set manual gain values or exposure times for image acquisition and processing, or other signal and image processing functions. All or some control of the image sensor is enacted through the USB by software running on the host computer.

Focusing Assembly:

Referring to FIG. 1A and FIG. 1B and FIG. 3A, FIG. 3B, and FIG. 3C, the optical imaging assembly (8) is mounted to the focusing assembly (7) by an interface plate (21).

Figure 3A:
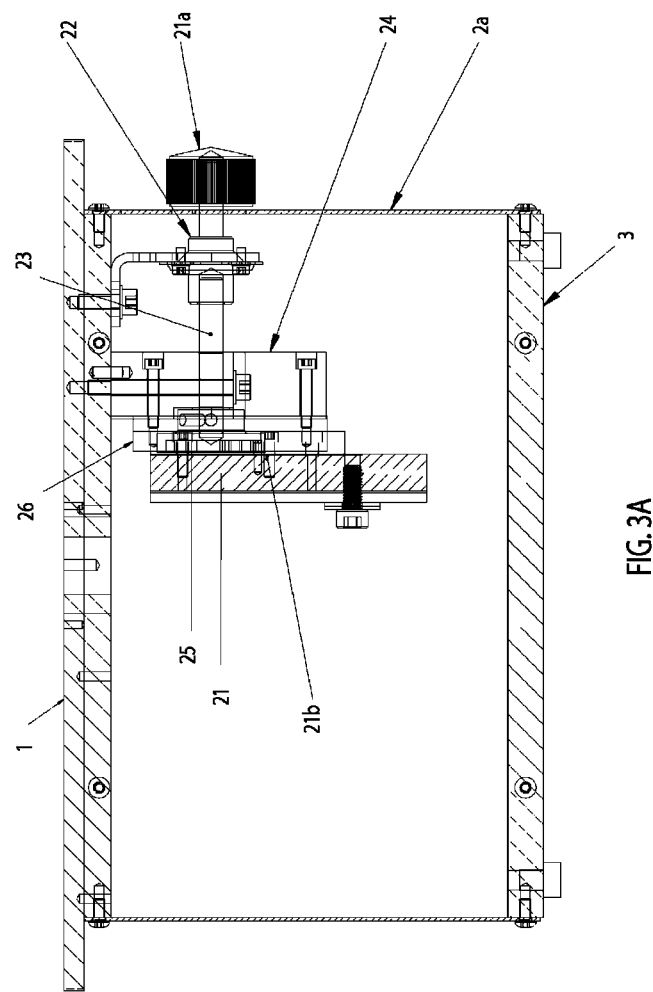
FIG. 3A depicts a cross-sectional view of a focusing assembly of a compact high-resolution fluorescence microscope of the present invention.
Figure 3B:
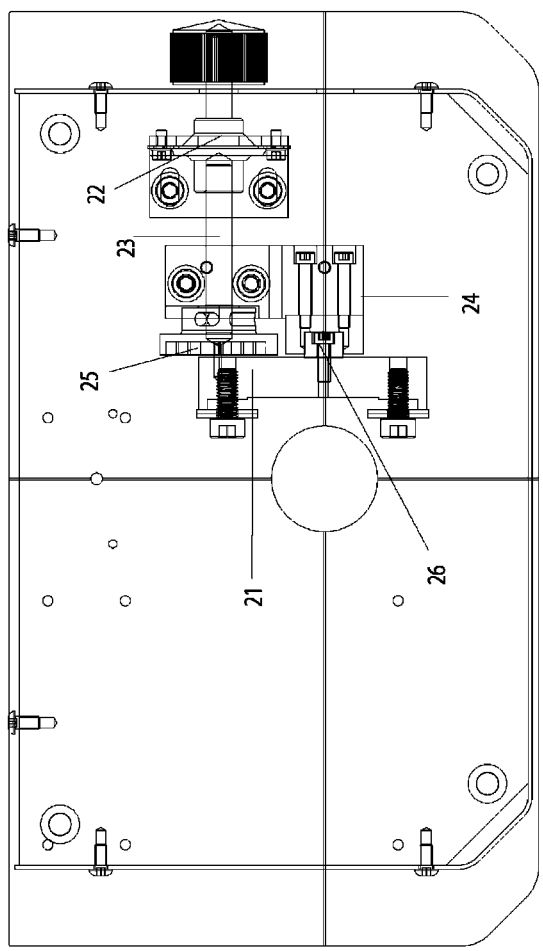
FIG. 3B depicts another cross-sectional view of a focusing assembly of a compact high-resolution fluorescence microscope of the present invention.
Figure 3C:
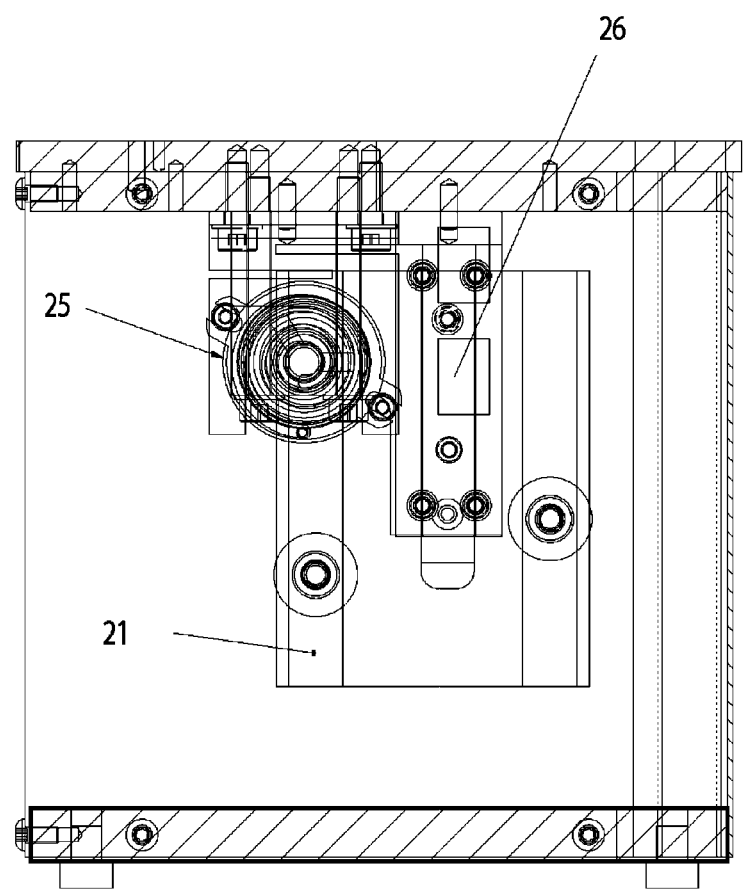
FIG. 3C depicts cross-sectional view of a focusing assembly of a compact high-resolution fluorescence microscope of the present invention.

Referring to FIG. 3A and FIG. 3B, the focusing knob (21a) is mounted by a set screw to the shaft protruding through a hole drilled through the main unit case (2a). This shaft terminates in a planetary reduction drive (22), which is mounted by an L-bracket to the underside of the stage (1) by two screws that are tightened so as to position the rotational axis of the shaft parallel to the horizontal plane of the top surface of the stage (1) and perpendicular to the object side to image side of the optical imaging assembly (8). Planetary reduction drive (22) is connected to shaft (23) by a compression fitting consisting of an outer rubber or other pliant material o-ring concentric with an inner plastic or other pliant material cylindrical washer having radial thickness such that when shaft (23) is pushed into the counter-bored receptacle in the planetary reduction drive (22), a tight fit is made. This method of attaching shaft (23) to drive (22) enables the optical imager assembly (8) to be traversed through the full range of vertical distance enabled by focusing assembly. The flexible compression coupling, however, absorbs any force of collision between the front lens of the objective lens (10) with the sample to prevent damaging the front lens, the sample, or the focusing assembly.

The opposite end of shaft (23) is inserted in a hole drilled through the mounting block (24). Mounting block (24) is attached to the underside of the stage by at least two screws through the block. The through-hole in mounting block (24) is precision milled to have a diametrical tolerance of preferably 2 μm such that shaft (23) fits snugly, but is still able to rotate without detectable sticking. The end of shaft (23) terminates with a circular brass disk (25). On the side of the disk facing the optical imager assembly, a spiral groove is milled, preferably having a width >2 mm and a depth >3 mm, to accept a dowel pin (21b) inserted into the interface plate (21) and to enable three complete circular turns of the disk between maximum upward and downward positions of the optical imaging assembly (8), which in a preferred embodiment, is a distance of at least 25 mm This allows for different heights of samples and desired planes of focus in samples on the stage 1. The groove may be box ended or may have a radius, but in the preferred embodiment, the length of the dowel pin (21b) protrusion into the groove is less than the groove depth such that the primary contact between dowel pin (21b) and disk is along the side wall of the spiral. This enables the up and down focusing traverse to be smooth. In a preferred embodiment, the diameter of the disk is >25 mm and the pitch of the spiral is approximately 3 mm, such that three complete turns of the spiral traverse a full length of 75 mm.

Interface plate (21) is attached to the mounting block (24) through a linear bearing slide (26). The outer sleeve of the slide (26) is faced to the mounting block (24) and attached to the block by four socket head-cap screws inserted through the opposite side of the block such that only the threaded portions of the screws extend beyond the mounting block. The accepting holes for these screws in the linear slide (25) sleeve are located near the corners of the sleeve. The inner slide of the linear motion slide (26) is attached to the interface plate (21) by socket head cap screws inserted into holes with countersunk cutouts for the head caps from the mounting block (24) side with threaded holes drilled into the inner slide. The linear slide (26) is located near the center of the interface plate (21) to provide a balanced mechanical support for the interface plate (21) and its attached optical imager assembly (8), as the imager assembly (8) is lifted and lowered by the dowel pin (21b) via the interface plate (21).

This focusing assembly (7) and its method of attachment to the optical imager assembly (8) provide mechanical support for the main elements of the microscope during focusing motions. The entire weight of the optical imager assembly (8) is borne by focusing assembly (7). The focusing assembly is mounted to the underside of the stage at two distinct locations, the L-bracket attachment for planetary reduction drive (22), and the mounting block (24) that supports the optical imager assembly (8) at the dowel pin and restricts its motion to a vertical direction by the linear motion slide (26). The two-location attachment of the focusing drive train—comprising the focusing knob (21a) and its shaft, planetary reduction drive (22) and its shaft (23) terminating at the spiral disk (25) provides two fulcrums for establishing and maintaining the horizontal mechanical axis for rotational motion of the focusing assembly. This requires machining of mounting block (24) such that the center of the through-hole for shaft (23) can be placed at a vertical distance below the underside of stage 1 within a tolerance of 0.1 mm. The L-bracket attachment of planetary reduction drive (22) is machined such that the vertical location of the corresponding center of the shaft within the drive can be placed at a vertical distance below the underside of stage (1) within the same tolerance. In addition, focusing assembly (7) is assembled in a specific order to achieve the optimal orientations of the horizontal focusing axis with respect to the top surface plane of stage (1). The circular spiral disk (25) is mounted to shaft (23) and inserted through the acceptance hole in mounting block (24), which is loosely screwed to the underside of stage (1). The planetary reduction drive (22) is then inserted into the acceptance slot of its L-bracket so that its shaft extends through the hole in the main unit case 2a, and the L-bracket is loosely attached to underside of stage (1). Only after the flexible compression fit at the end of shaft 23 is pressed into its receptacle in the planetary reduction drive (22) and shaft (23) is positioned horizontal to the underside of stage (1) and parallel to the front wall of unit case 2a are the L-bracket tightly screwed to the underside of stage (1), planetary reduction drive (22) firmly screwed to said L-bracket, and mounting block (24) tightened to the underside of stage (1). Alignment of shaft (23) with the stage (1) underside and unit case 2a wall are easily performed with a straight-edged ruler or other metric device. Finally, the linear bearing slide (26) is attached to interface plate (21), and both interface plate (21) and the outer sleeve of the linear bearing slide (26) are attached to the mounting block (24). The screw-holes for these attachments are located at positions on the mounting block that allow easy access when the shaft (23) is already attached to the block. The microscope assembly is finished by attaching the optical imager assembly (8) to the interface plate (21) at two slightly offset locations, one directly below the dowel pin and one located on the opposite side of the linear bearing slide (26). These attachment locations maintain the optical axis of the optical imager assembly (8) vertical with respect to the plane of the stage (1) and prevent toppling.

Figure 4:
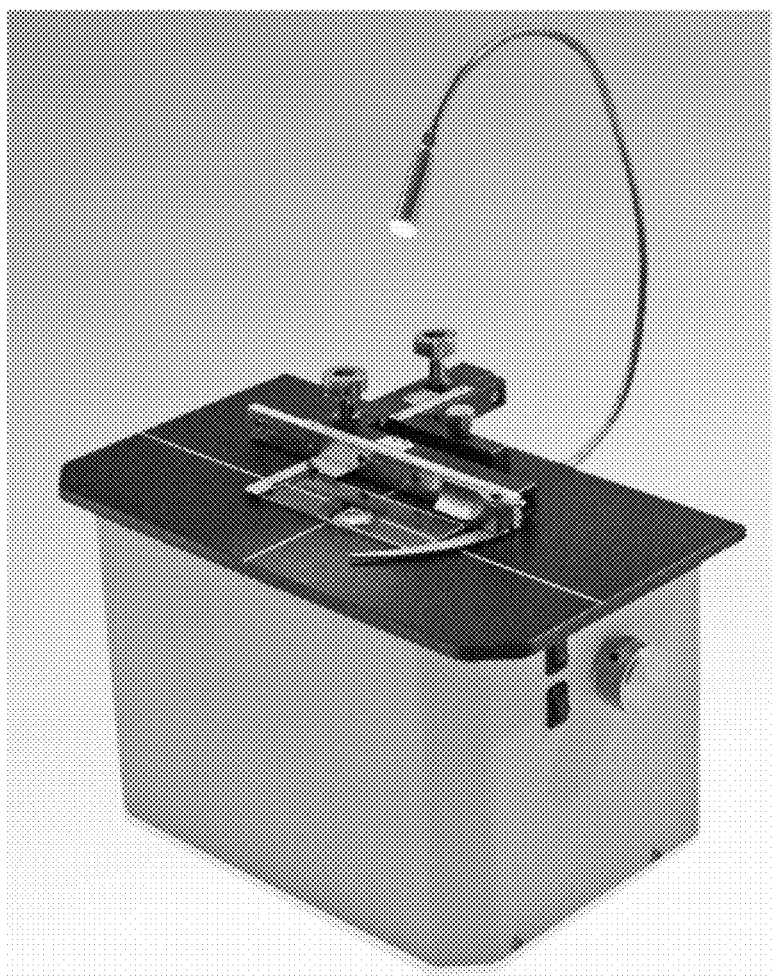
FIG. 4 is a photograph of an assembled compact high-resolution fluorescence microscope of the present invention.

A photograph of the assembled microscope is shown in FIG. 4.

Microscope Control:

Referring to FIG. 1A and FIG. 1B, in a preferred embodiment, electrical power to the excitation light source is available from either an external power source connected to connector 5 or the USB control connector 4. Electrical power to the remaining subsystems is derived from the 5 V USB power. Both connectors 4 and 5 terminate on an electrical control board (4a) that contains the electrical subsystems of the microscope, with the exception of the excitation light source (14), and image sensor (20)

In a preferred embodiment, the microscope is controlled by a program running on the host computer that initially configures the on-chip control registers of the integrated CMOS sensor to continuously acquire image data and output said data in a specified format and at a specified image rate to a volatile buffer in the USB interface, from which the host continuously reads the formatted data to a buffer in the memory of the host computer from whence it is displayed through a graphical user interface. In a further specification of the preferred embodiment, the program runs on the host in a mode in which the memory required for its operations is protected from being overwritten by the computer's operating system, and assertions to the operating system from the program are handled with a priority enabling continuous display of complete images acquired by the sensor in a manner that appears smooth and pleasing to the human eye. In a further specification of the preferred embodiment, the host program enables the user to select between modes in which the image sensor uses on-chip processing of the light intensity values in an image to control its gain, exposure time, the rate at which it outputs complete, formatted image frames, and other image acquisition parameters, or uses values for said parameters selected by the user and written to the appropriate control registers of the sensor.

Figure 5A:
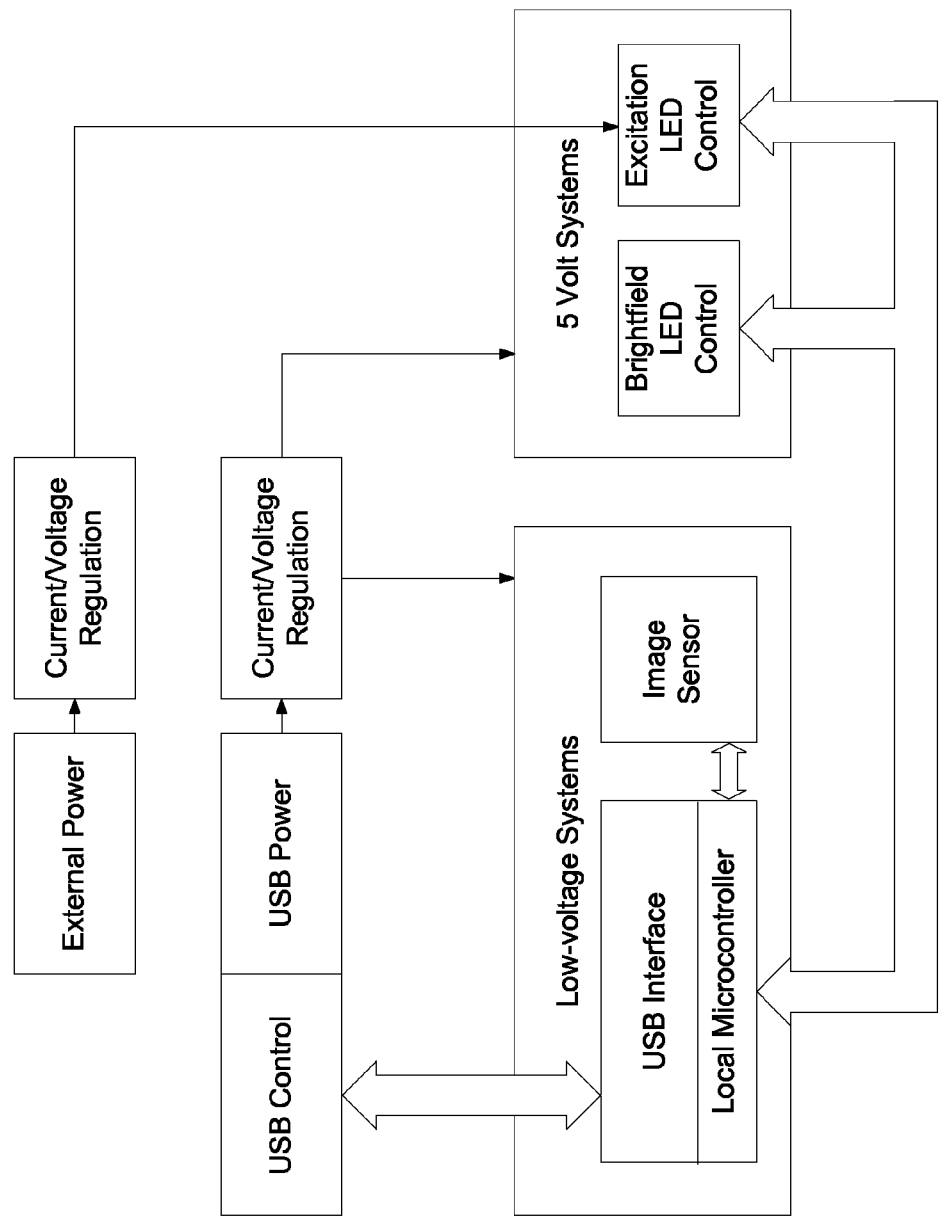
FIG. 5A depicts an electrical subsystem of a compact high-resolution fluorescence microscope of the present invention.
Figure 5B:
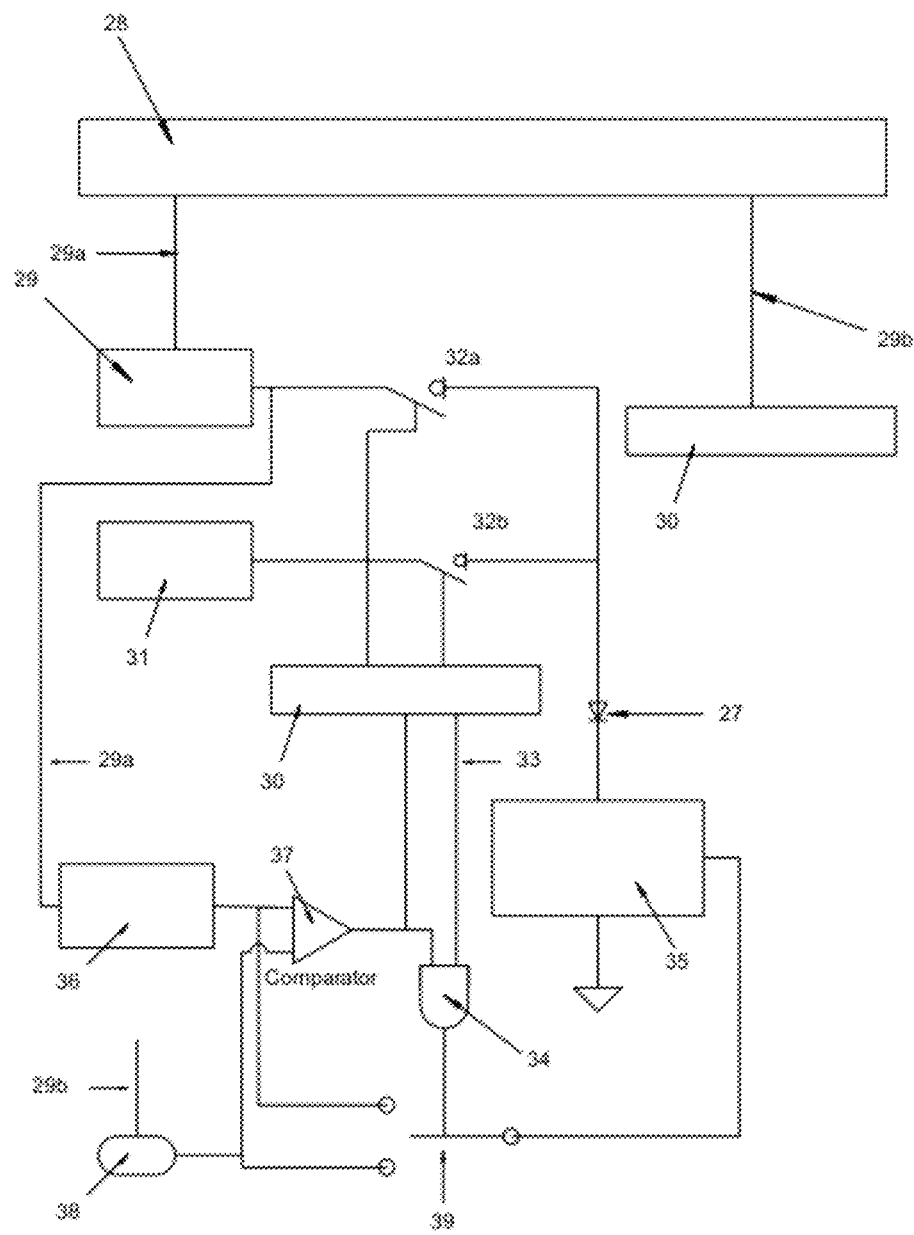
FIG. 5B depicts another electrical subsystem of a compact high-resolution fluorescence microscope of the present invention.

Referring to FIG. 5A and FIG. 5B, power is delivered to the microscope from the USB connector to the host computer. The block diagram of power distribution and control of the brightfield and excitation light sources and the image sensor is outlined as a block diagram in FIG. 5A. USB power is delivered by the USB connector from the host computer. Current limitation and voltage regulation of this 5 V supply is used to power the brightfield led, the image sensor (20), the USB interface, and the local microcontroller. When external power is present, the local controller switches the excitation light source (14) power source from the 5 V USB supply to the external power source.

Control of the excitation light source power source (27) is depicted in FIG. 5B. Power is derived for the microscope from the host computer (28) via the USB connector (29). The USB connection from the host computer (28) delivers USB power (29a) to the microscope, and enables control communication (29b) with the local microcontroller (30). In the absence of external power supplied to the external power connector (31), the local controller (30) enters USB power mode for the light source (27). In USB power mode, local controller (30) closes the USB SPST power switch (32a) after first opening the external power SPST switch (32b), whose outputs are connected in common to one terminal of the light source (27), and sets its control output (33) high to the AND gate (34). Illumination by the light source (27) is controlled by its current, which is determined by a voltage-controlled current regulator (35) set to a desired value by a constant voltage reference (36) also connected to USB power (29a). The output of the constant voltage reference (36) of the USB supply is connected to the inverting input of the comparator (37) to which is connected the output of a digital-to-analog converter or DAC (38) at its non-inverting input. The DAC (38) outputs a current setting sent to it by the host computer (28) via USB control communication. In USB power mode (in the absence of external power), the current setting output from the DAC (38) is set by the host computer (28) to a value greater than that of the output of the constant voltage reference (36), such that the output of the comparator (37) is high, and said output is sent to the AND gate (34) and to the local controller (30). The output of said AND gate (34) is used to control the input switch (39) of the current regulator (35). When said output is high, the input switch (39) connects the current regulator (35) to the output of the constant voltage reference (36) derived from USB power, hence supplying the light source (27).

When external power is supplied to the microscope through the external power connector (31), the connection to the local controller (30) causes said controller to enter external power mode by opening USB SPST power switch (32a) and closing external SPST power switch (32b), thus connecting one terminal of the light source (27) to the external power source, and to signal the status of excitation light source power to the host computer (28). Said host, in turn, sends the desired current level for the current regulator (35) to the DAC (38). In addition, the local controller (30) pulls its control output (33) to the AND gate (34) low, such that output of said AND gate sent to the input switch (39) is low. This causes the input switch (39) to connect current regulator (35) to the DAC (38), thus supplying the excitation light source with external power.

In a preferred aspect of the present invention, the host computer (28) can switch the desired current setting of the light source (27) by toggling its input to DAC (38) between a high value and a low value so as to provide one or more pulses of illumination light, independently of whether said light source (27) derives power from USB or an external source. These pulses can have durations less than one microsecond and can have periods elapsing between successive pulses of sufficient duration to enable time-resolved fluorescence from the sample to be acquired by the image sensor.

In a preferred embodiment, the host program provides the ability for the user to save any image stored in the frame buffer to a file on an archiving device either present within or attached to the host computer, such as a hard disk drive. In a further specification of the preferred embodiment, the image file may be automatically named with a name that includes the date and time at which the image was acquired and stored. In a further aspect of the preferred embodiment, the user may configure the host program to save multiple acquired images at a user-specified periodic interval, for either a fixed period of time or continuously until storage is manually stopped by the user, and that the names of these sequentially saved files indicate the number of the file in the sequence. When the user-specified interval is zero, the host program archives each image from the memory buffer in a sequence of contiguous frames analogous to a video stream.

Figure 6:
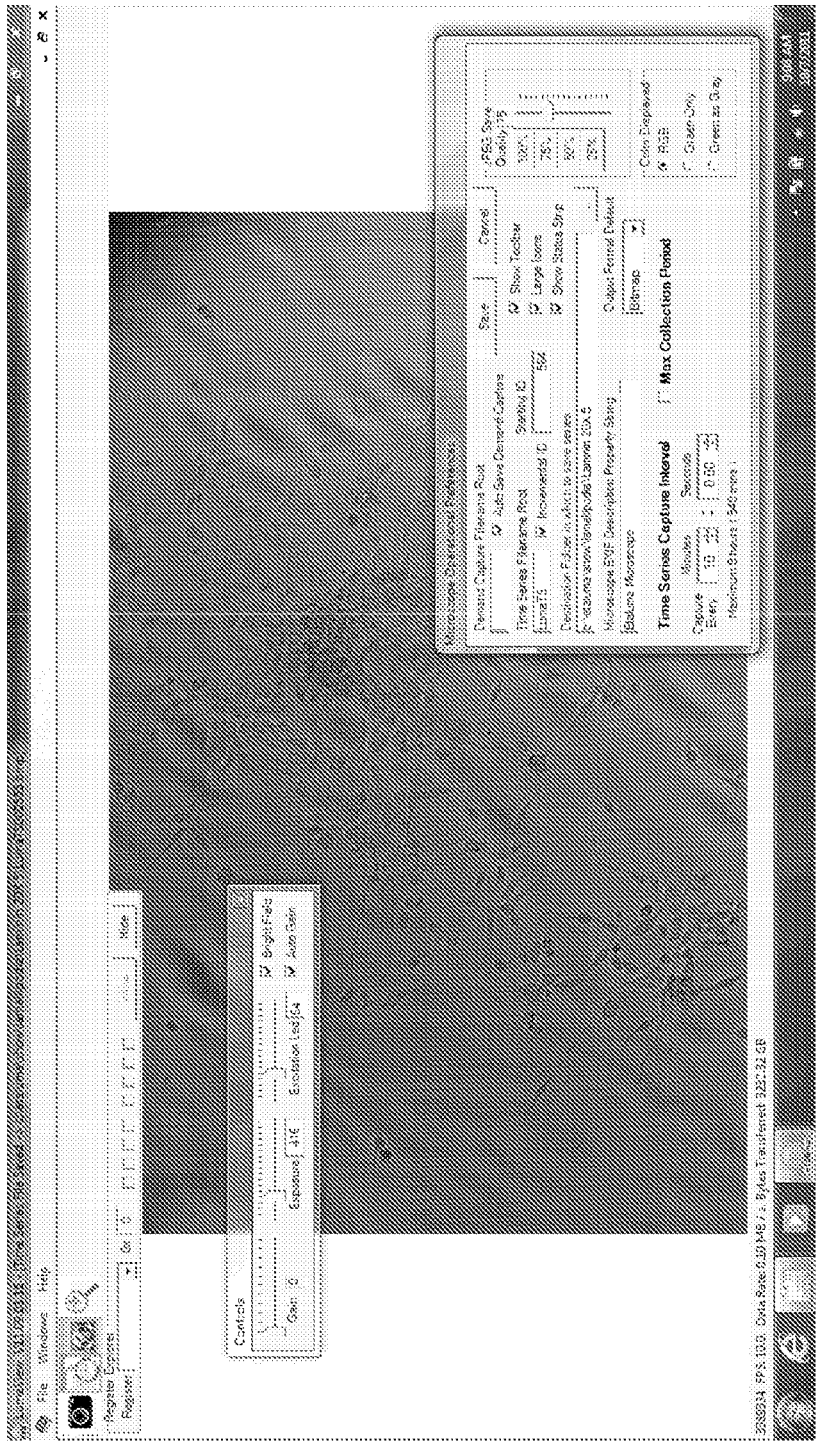
FIG. 6 depicts a display of a host computer running the microscope control program whiles acquiring images cells.

An example of the graphical user interface of the host control program including forms for control of gain, exposure, and light source power and control of time lapse acquisition and saving of images is shown in FIG. 6.

An x-y caliper can be attached to the stage surface for holding microscope slides, cover slips, and other samples firmly. Motion of the caliper in each direction may be made to position the sample at precise locations by the aid of marked vernier distance scales. The caliper enables the sample to be scanned over the field of view to obtain field images separated by accurate distances. The caliper is attached to the stage by knurled screws that can be manually tightened into threaded holes drilled through the upper surface of the stage. This allows the caliper to be removed from the stage to accommodate large, bulky samples, such as tissue culture flasks, multiwell plates, and other samples that are unable to be clamped by the caliper.

Transmission brightfield illumination of the sample is readily achieved with a light source placed above the observation hole of the stage. In a preferred embodiment, a white LED at the end of a flexible gooseneck connector is attached to connection 6 (FIG. 1A and FIG. 1B) on the main unit case. This connector terminates inside the enclosure in a circuit board-mounted voltage regulator that powers the led. The location and direction of the brightfield illumination are adjusted manually above or around the sample to achieve the desired type of illumination. For example, acute illumination of the through tissue culture flasks made of stressed, and thus birefringent plastic slightly polarizes the illuminating light, and enables contrast in the sample to be generated by interference modulation. In an alternative example, illumination of the sample at a highly oblique grazing angle enables an image to that generated by phase-contrast. Transmission white light illumination is useful for locating regions of the sample to be observed under fluorescence epi-illumination and for obtaining an accurate focus position.

In a preferred embodiment, the host computer may control both epi-illumination and brightfield light sources to enable simultaneous acquisition of both brightfield and fluorescence views of the sample within the same image acquired by the image sensor. This enables the source of fluorescence emissions to be localized within a sample to within non-fluorescent but otherwise refractive or reflective elements of said sample. In addition, the epi-illumination may be pulsed during the acquisition time of an image frame by the image sensor in order to decrease fluorescence noise from the sample recorded by the sensor in the image.

II. A Method of Using an Inverted Fluorescence Microscope

The present invention includes a method of using an inverted fluorescence microscope of the present invention. The method includes providing a sample and providing a microscope of the present invention. The sample is engaged with the microscope as described herein, and an image is generated. Preferably, there are no structures to allow a human operator to view the image directly, such as those structures provided in traditional microscopes. The image is displayed on a screen and optionally stored on a storage media. The image can be a still shot, as single frame, a video or a time lapse image. The image can be a grey-scale, a single color, or multiple colors.

EXAMPLES

Because other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Example 1

This example establishes the ease of use of a microscope of the present invention and computer interface and output with a microscope of the present invention.

Ease of use of the microscope is shown in FIG. 5A and FIG. 5B, which is a captured screen shot of the host computer running the control program for the preferred embodiment. An image of human neural stem cells derived from 13 week-old fetal telencephalon growing in a T25 polystyrene tissue culture flask with the growth surface coated with mouse laminins and observed with brightfield illumination through the top of the flask and with a Meiji 20× magnification 0.4 N.A. 7 mm working distance objective is shown in the image display area of the graphical user interface. The image displayed is the last one acquired during time lapse acquisition and saving of images once every 10 min. The acquisition sequence had been running continuously for 5 days when this screen capture was obtained. The four basic tools for operation of the program are located along the bar at the top of the display, and include icons (1) for snapping a single image from live, continuous display of sequential images from the sensor, (2) for starting and stopping time-lapse acquisition, (3) for setting up parameters for time-lapse acquisition, and (4) for user help in operating the program. Under the tool bar is a form for direct reading and writing of control registers in the intergrated CMOS sensor; this form can also be closed and removed from the display during normal operation. Control forms for gain, exposure, and illumination power and for entering time-lapse acquisition control parameters, such as the time interval between saved images, the total period of time during which images are acquired, the file seed name, and the path to the storage location of the saved images, are shown overlapping the displayed image. These forms can be closed or otherwise hidden from view during operation of the microscope.

Example 2

This example establishes the application of a microscope of the present invention for educational purposes.

Figure 7:
FIG. 7 depicts an image of fixed *Paramecium tetraurelia* made using a compact high-resolution fluorescence microscope of the present invention.
Figure 8:
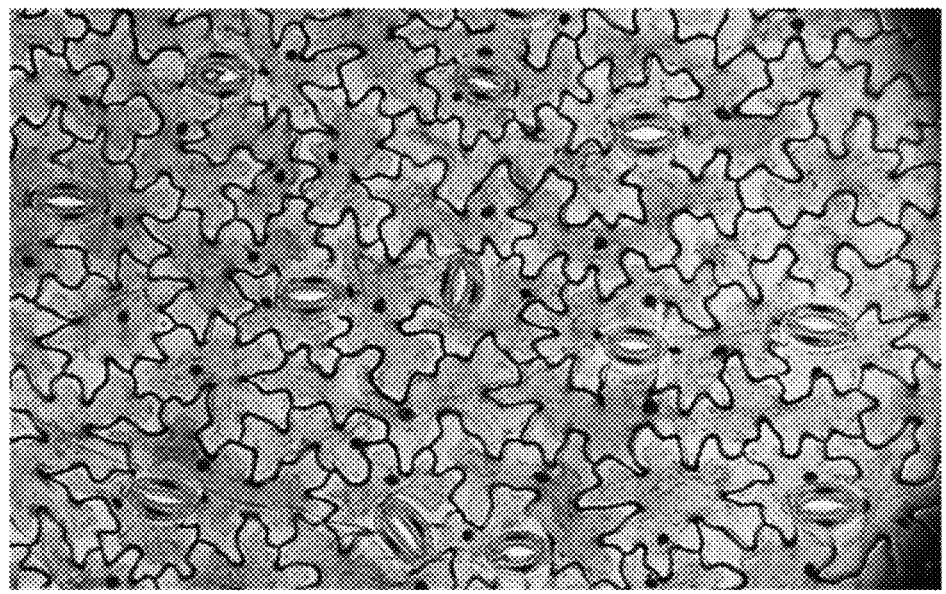
FIG. 8 depicts an image of a horizontal section through a leaf of *Vicia fava* made using a compact high-resolution fluorescence microscope of the present invention.
Figure 9:
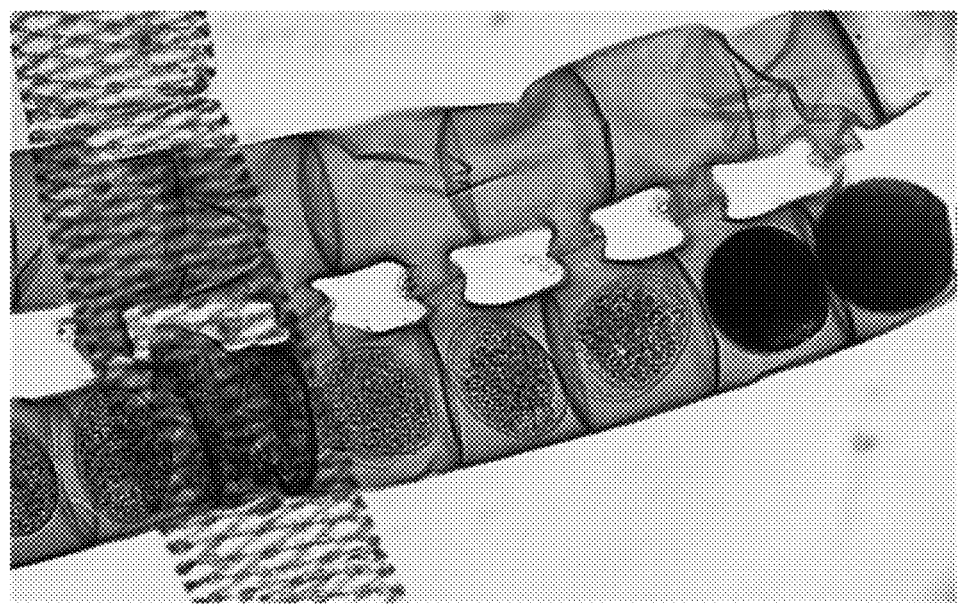
FIG. 9 depicts an image of *Spirogyra crassa* made using a compact high-resolution fluorescence microscope of the present invention.

Brightfield images obtained with the educational set of microscope slides "The 5 Kingdoms" (cat. no. E2-70-4016, Neo/Sci, 80 Northwest Blvd., Nashua, N.H.) with the use of the Meiji 40× magnification 0.65 N.A. 0.5 mm working distance objective in the preferred embodiment is shown in FIG. 7, FIG. 8 and FIG. 9. FIG. 7 is an image of fixed *Paramecium tetraurelia*. Key definitive morphological features of the protozoans, including cilia and micronuclei, can be resolved. FIG. 8 is an image of a horizontal section through a leaf of *Vicia fava* (broad bean). The stomata that regulate water exchange between the leaf and the atmosphere and cell nuclei are clearly observed. FIG. 9 is an image of *Spirogyra crassa*, a filamentous freshwater green alga. To the left of the image, the helical arrangement of photosynthetic chloroplasts around prominent cell nuclei is visible in the vertical filament. Extending across the image are two filaments undergoing lateral conjugation, with two compartments in zygophore stage visible at the right. As "The 5 Kingdoms" microscope slide set is aimed to junior high and middle school science education, these examples in FIG. 7, FIG. 8 and FIG. 9 demonstrate the capabilities of the preferred embodiment as an educational tool.

Example 3

This example establishes the application of a microscope of the present invention for research and educational purposes.

Figure 10:
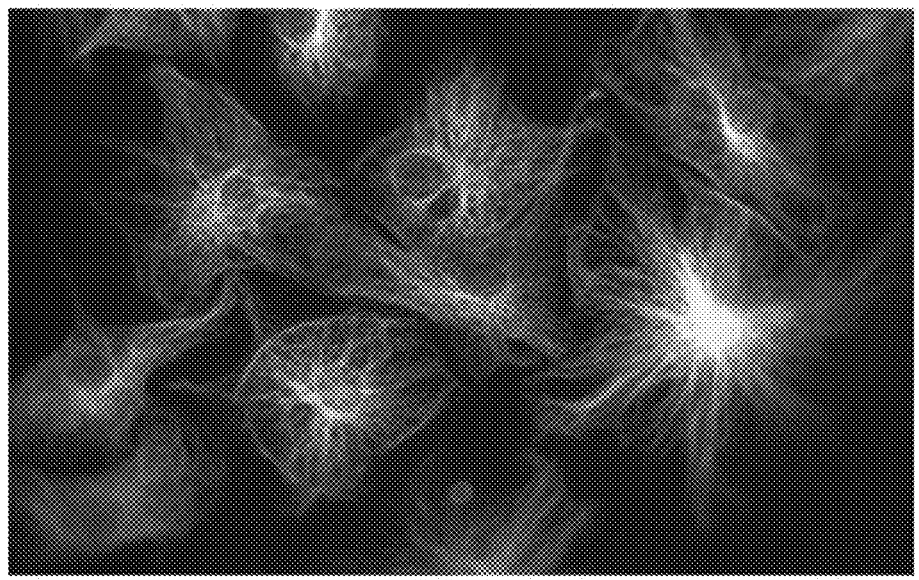
FIG. 10 depicts an image of bovine pulmonary arterial endothelial cells made using a compact high-resolution fluorescence microscope of the present invention.
Figure 11:
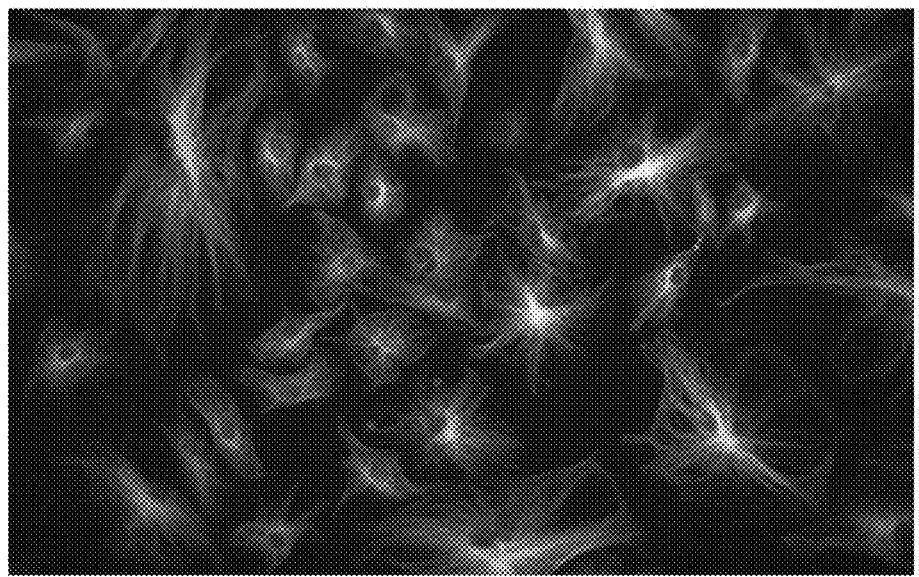
FIG. 11 depicts an image of bovine pulmonary arterial endothelial cells made using a compact high-resolution fluorescence microscope of the present invention.

Usefulness of the preferred embodiment is demonstrated for research and education is demonstrated in the fluorescence images of bovine pulmonary arterial endothelial cells (BPAEC) shown in FIG. 10 and FIG. 11. BPAEC were cultured on a gelatin-coated no. 0 coverslip for 3 days, fixed with buffered 4% formaldehyde for 15 min, washed three times in buffer, incubated for 3 hrs in BODIPY FL-labeled phallacidin (Life Technologies, Cat. No. B607), washed 3 times in buffer and mounted on a microscope slide by techniques well-known to those skilled in the art. The slide was affixed to the x-y stage caliper with tape and mounted on the stage of the preferred embodiment with the coverslip facing the objective lens. Phallacidin binds to filamentous (F) actin, one of the predominant structural proteins of eukaryotic cells that maintain their shape and integrity, and enable their motility.

FIG. 10 was obtained with a. Meiji 100X N.A. 1.25 infinity-corrected oil-immersion objective with 0.14 min working distance. FIG. 11 was obtained with a Meiji 40X N.A. 0.65 infinity-corrected air objective with a 0.5 mm working distance.

The preferred embodiment of the invention was configured for fluorescence as follows: Light from a LUXEON Rebel Blue LED (Part. No. LXML-PB01-0040, Philips Lumileds Lighting Co., San Jose, Calif.) powered with a continuous current of 700 mA was passed through a 475 nm center-wavelength filter with a full-width at half-maximum (fwhm) passband of 35 nm (Semrock, Inc., Rochester, N.Y.) custom-cut to fit in the excitation filter position (17) of the optical imager assembly (FIG. 2) and the filtered illumination light was reflected to the sample with a 506 nm-edge dichroic beamsplitter (Part. No. FF506-Di03, Semrock) also custom-cut to fit at the dichroic mirror position (12). Fluorescence emitted by the sample was passed through a 535 nm center wavelength filter with a fwhm passband of 43 nm (Semrock) custom-cut to fit in the emission filter position (18, see FIG. 2). Projection (tube) lenses used to focus light collected by the objectives were a 10 mm diameter plano-convex lens with +20 mm focal length, in tandem with 2 12.5 mm dia. achromat lenses, the first with a 40 mm focal length, and the second with a 100 mm focal length. An integrated CMOS sensor (OVT 9715, Omnivision Technologies, Sunnyvale, Calif.) was used to capture the image.

The 100× oil immersion image of the labeled BPAEC in FIG. 10 reveals considerable structural details of the arrangement of F-actin in these cells. As the depth of field of the 100× objective is so thin (<1 µm), the sample was focused at the cells in the center of the image, such that the cells along the bottom of the image, which were at different heights in the gelatin coating compared to the cells at the center, have been allowed to be less well-focused. The nuclear and perinuclear region is revealed as either brightly labeled, or surrounded by a thick F-actin ring. Farther away from the nuclear region, the filaments are less thick, yet still thicker that the very thin filaments near the periphery of the cells where the cells extend motile protrusions toward unoccupied areas of the growth surface.

FIG. 11 was obtained after replacing the 100× objective lens with the 40× air objective and reattaching the stage caliper with attached microscope slide. Due to the ~2 µm depth of field of the lower magnification objective, the cells throughout the field of view appear to be in focus. The pattern of actin staining observed in greater detail in FIG. 9 is revealed in FIG. 10 to be typical for the cells throughout the slide culture. In addition, it is noteworthy that even with mechanical replacement of the objective requiring removal of the rear cover of the preferred embodiment, the center of the field of view in FIG. 10 is at the same location in FIG. 11.

Example 4

This example establishes the application of a microscope of the present invention for research purposes.

Figure 12:
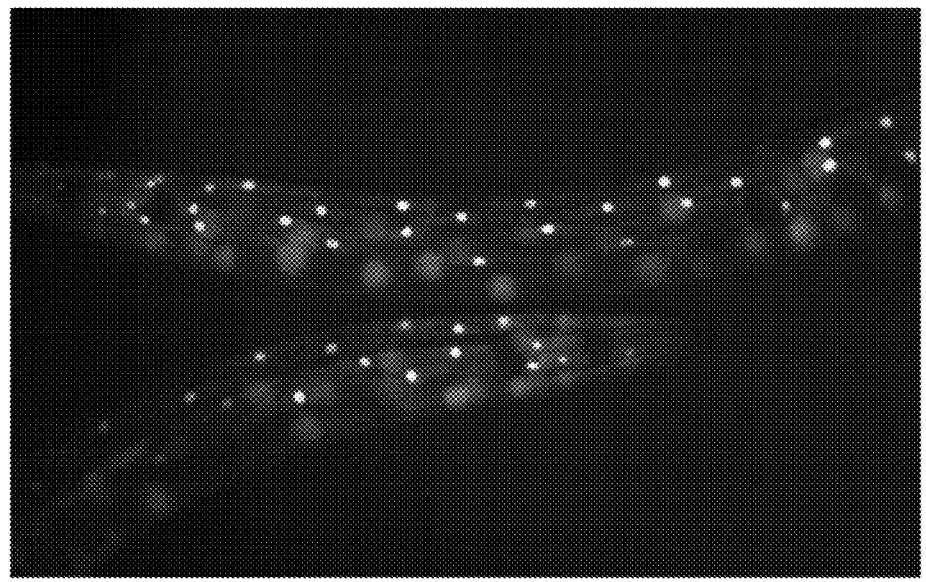
FIG. 12 depicts an image of transgenic nematodes made using a compact high-resolution fluorescence microscope of the present invention.
Figure 13:
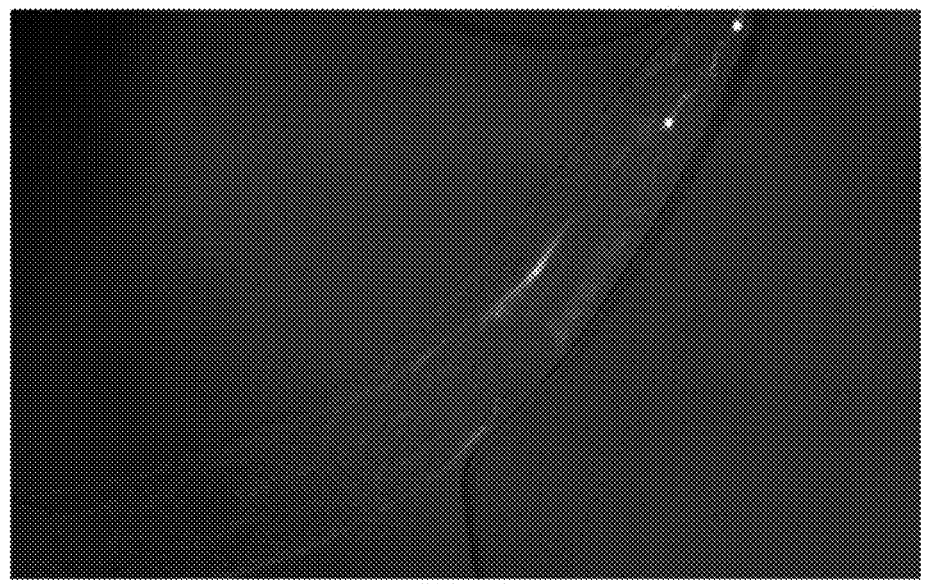
FIG. 13 depicts an image of transgenic nematodes made using a compact high-resolution fluorescence microscope of the present invention.

Further utility of the preferred embodiment for research is illustrated in FIG. 12 and FIG. 13, which were obtained in a setting of college instruction in molecular biology. For this study, transgenic nematodes, *Caenorhabditis elegans,* were generated by parental transduction with a transposable genetic element encoding Emerald Green Fluorescent Protein (EmGFP) under control of a myosin II promoter element with an intervening nuclear localization signal sequence fused to the N-terminus of the EmGFP. Therefore, the construct is expressed in muscle cells of the nematode. FIG. 12 shows an image of the progeny of these transgenic nematodes obtained with a 40× objective in the fluorescence configuration of the preferred embodiment as described in Example 3. The fluorescence intensity confined to bright oval shapes along the worm are nuclei of muscle cells in the plane of focus, whereas the larger regions of decreased intensity are nuclei of muscle cells located out of said plane. FIG. 13 is an image of a comparable nematode progeny of a parental line transduced with the same EmGFP construct, but in addition transfected with a plasmid bearing a short-hairpin interfering RNA. (RNA The RNAi sequence was directed to the N-terminus of the EmGFP transcript, such that transcription of the hairpin resulted in knock down of EmGFP, The image of the animal in FIG. 13 reveals significant attenuation of nuclear fluorescence compared to that in FIG. 12.

Example 5

This example establishes the application of a microscope of the present invention for diagnostic purposes.

Figure 14:
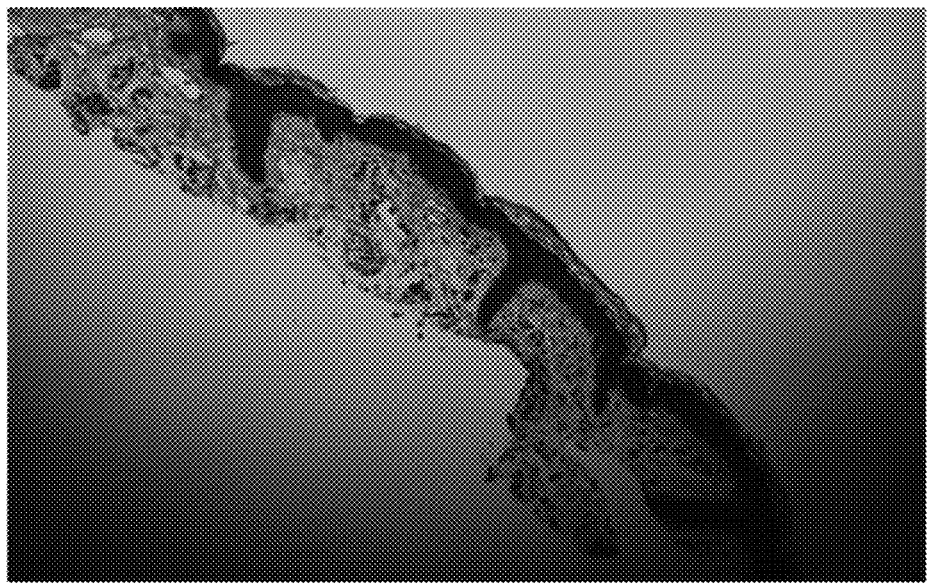
FIG. 14 depicts a brightfield image of a transverse section of the dermal layer of human skin containing a nevus or mole from a biopsy made using a compact high-resolution fluorescence microscope of the present invention.
Figure 15:
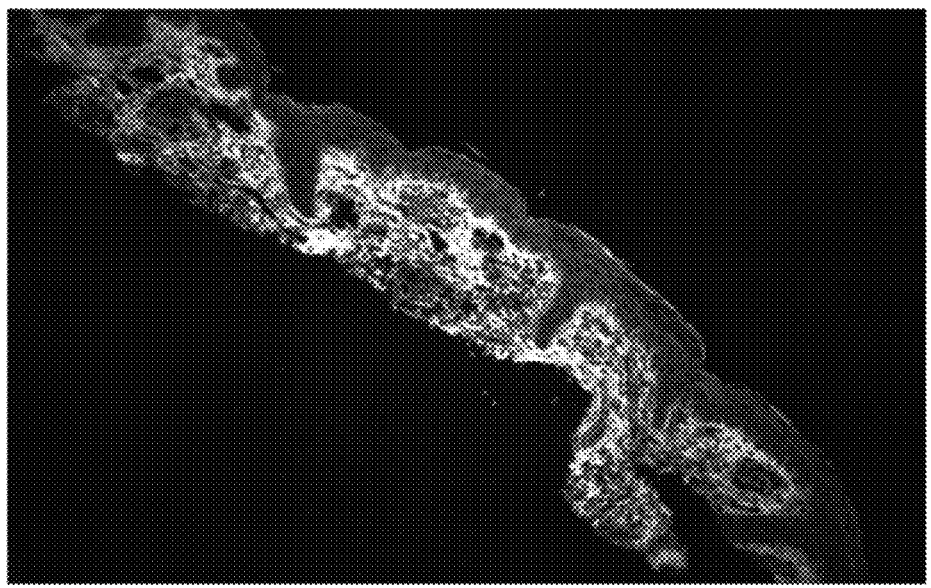
FIG. 15 depicts a fluorescent image of a transverse section of the dermal layer of man skin containing a nevus or mole from a biopsy made using a compact high-resolution fluorescence microscope of the present invention.

Usefulness of the preferred embodiment in diagnostics is illustrated in FIG. 14 and FIG. 15, which are brightfield and fluorescence images, respectively, of a transverse section of the dermal layer of human skin containing a nevus or mole from a biopsy. The section, obtained and viewed in a dermatology clinic, was stained with hematoxylin and eosin by procedures known to those skilled in the art. FIG. 14 is an image of the section under clinic room light, and shows the nevus along the epidermal layer or stratum griseum of the skin with protuberances down into the dermis. In the image acquired under fluorescence illumination shown in FIG. 15, collagen and elastin fibers are stained intensely by the eosin. A clinician uses the relative intensity of this fluorescence staining to determine the extent to which the nevus has altered the suppleness of the underlying skin and to judge whether the mole exhibits dysplasia or is a melanoma warranting excision.

Example 6

This example establishes the application of a microscope of the present invention for diagnostic purposes.

Figure 16:
FIG. 16 depicts an image of an unstained section of normal human small intestine showing auto-fluorescence made using a compact high-resolution fluorescence microscope of the present invention.
Figure 17:
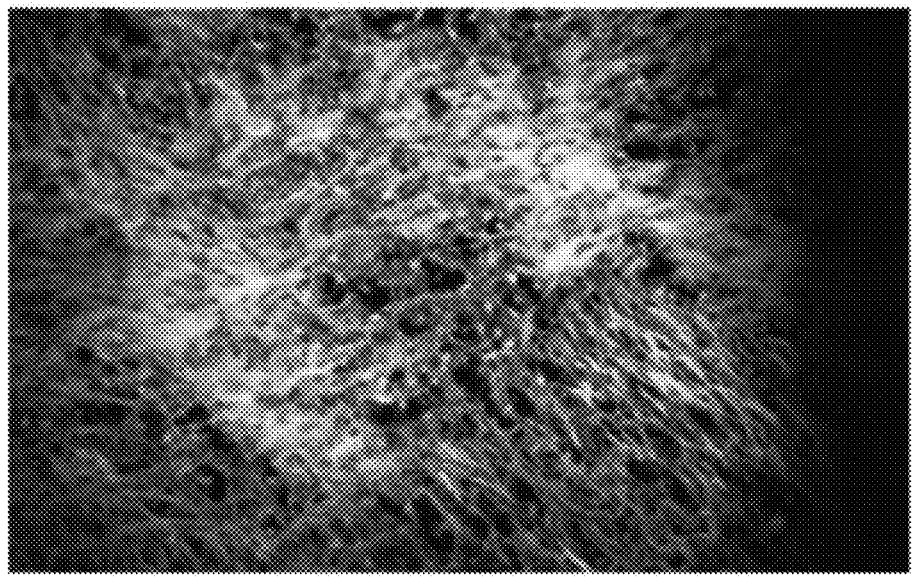
FIG. 17 depicts an image of a section from a small intestinal tumor obtained from a human patient made using a compact high-resolution fluorescence microscope of the present invention.

Further utility of the preferred embodiment in diagnostics is shown in FIG. 16 and FIG. 17. FIG. 16 shows an unstained section of normal human small intestine obtained in fluorescence with the preferred embodiment, showing the intense autofluorescence of the intestinal epithelium lining the villi consistent with gastrointestinal health. FIG. 17 shows a section from a small intestine tumor obtained from a human patient, showing the profound disorganization of tissue fluorescence characteristic of tumor growth.

Example 7

This example establishes the application of a microscope of the present invention for research purposes when multiple fluorescent dyes are present in the sample.

For this example, a specimen is labeled with multiple fluorescent dyes, each of which is maximally excited to fluorescence emission at a different excitation wavelength, and each of which emits maximally a different wavelength of light. Such multiple dye labeling is well-known to those skilled in the art, and may be obtained by indirect immunofluorescence of different epitopes in a sample with primary antibodies raised against said epitopes in different mammalian species, followed by binding isotype-matched secondary antibodies with each secondary antibody labeled with a different fluorescent dye.

A microscope of the present invention is configured for fluorescence as follows: Light from a LUXEON Rebel Blue LED (Part. No. LXML-PB01-0040, Philips Lumileds Lighting Co., San Jose, Calif.) powered with a continuous current of 700 mA is passed through an excitation filter having at least two center-wavelengths with non-overlapping fwhm passbands sufficiently narrow such that at least two wavelengths of well-separated light are produced. This filter is placed in the excitation filter position (17) of the optical imager assembly (FIG. 2). The filtered illumination light is reflected to the sample with a dichroic beamsplitter located at the dichroic mirror position (12). The dichroic beamsplitter is selected so that the edge wavelength reflects the wavelengths of excitation light. Fluorescence emitted by the sample is passed through an emission filter located at the emission filter position (18, see FIG. 2) having center-wavelengths matched to the wavelengths emitted by the multiple fluorescent dyes. The fwhm passbands surrounding these center wavelengths are chosen such that each dye's fluorescence emission is well-separated from the other dyes. Projection (tube) lenses are used focus light collected by the objective lens onto an integrated CMOS sensor (OVT 9715, Omnivision Technologies, Sunnyvale, Calif.) is used to capture the image. Fluorescence by the multiple dyes is separated into separate images, one for each dye, by the host computer applying a selection algorithm to the Bayer color pattern of the resulting image.

Example 8

This example establishes the application of a microscope of the present invention for research purposes for acquiring one or more simultaneous brightfield and fluorescence images in which fluorescence noise is decreased by pulsing the excitation light source.

The sample is illuminated by the brightfield light source. The host computer program then pulses the epi-illumination light source with a signal less than 10 μsec in duration with a delay allowing read out of image data from the sensor to be triggered at a user-specified delay. The resulting image shows fluorescence overlayed on a brightfield image of the sample.

Example 9

This example establishes the application of a microscope of the present invention for research purposes by using time-lapse acquisition of multiple images of a dynamic biological process.

Figure 18:
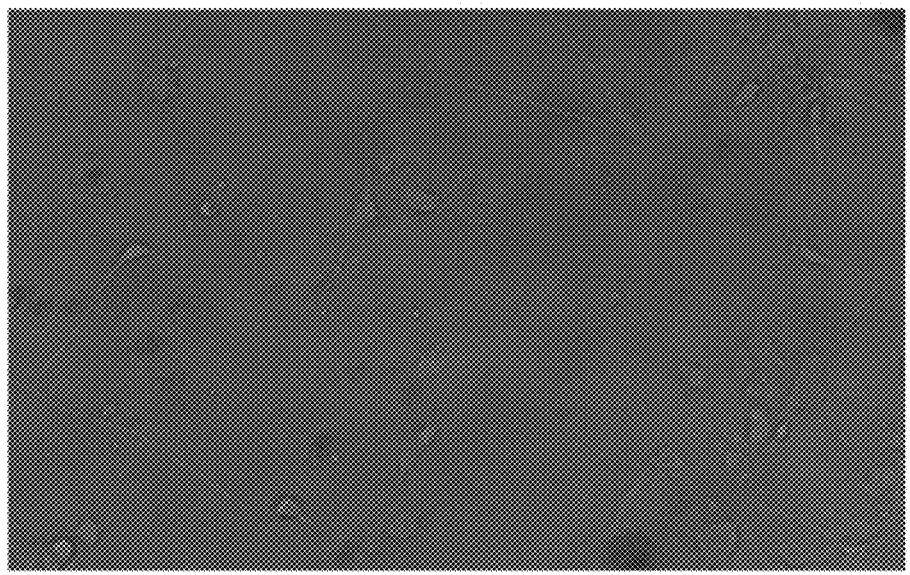
FIG. 18 depicts an image of fetal telencephalon-derived human neural stem cells obtained by time-lapse image acquisition.
Figure 19:
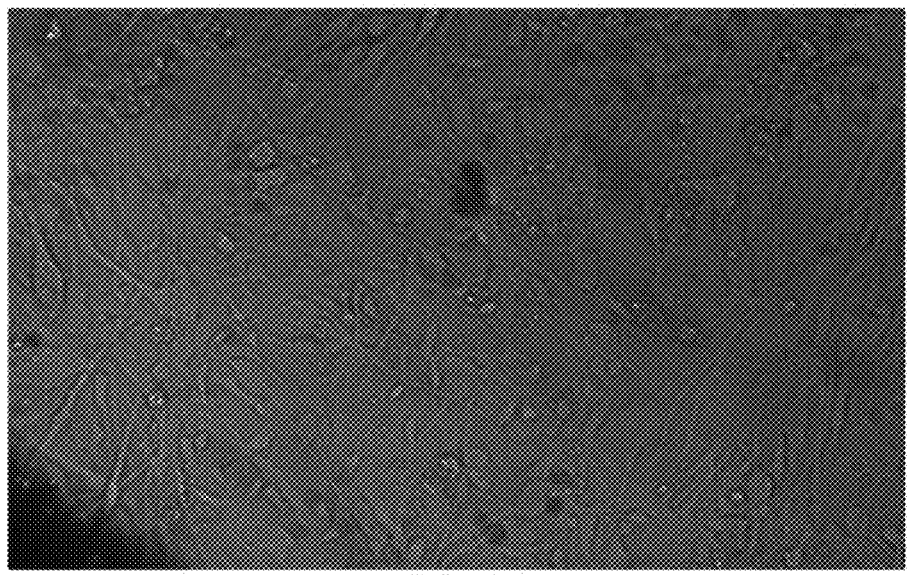
FIG. 19 depicts an image of fetal telencephalon-derived human neural stem cells obtained by time-lapse image acquisition.

The glass bottom (0.15 mm thin) of a FluoroDish (Cat. No. FD-35, World Precision Instruments, Ltd., Hertforshire, UK) was coated with 10 μg/ml Poly-L-Ornithine in water for 24 hr at 37° C. After washing with phosphate-buffered saline, the glass surface was coated with 10 μg/ml mouse laminins in water for 24 hr. The surface was seeded with the neural stem cells described in Example 1 at a density of 100,000 cells per $cm^2$. A microscope of the present invention was placed in a humidified incubator maintained continuously at a temperature of 37° C., and the covered FluoroDish was placed on the stage. The sample was observed with a 40× objective. The program on the host computer was configured to illuminate the brightfield LED for 4 sec once every 10 min, during which time an image was acquired from the sensor and archived with a file name containing indicia of the date and time that the image was acquired. FIG. 18 is an image obtained after the fetal neural stem cells had settled on the laminin-coated glass surface within 6 hr of seeding. FIG. 19 is an image acquired 5 days later, revealing the expression of extensive lamellipodia exploring the laminin-coated surface, and the formation of proliferation colonies.

REFERENCES

Karaki, K. 2011 U.S. Pat. No. 7,903,327 Fluorescence microscope apparatus
Fey, F. H. A. G. 2011 U.S. Pat. No. 8,000,003 Fluorescence microscope
Motomura, S. 2011 U.S. Pat. No.7,902,523 Fluorescence microscope apparatus
Yamamoto, S. 2009 U.S. Pat. No. 7,639,420 Fluorescence microscope
Kang, U., Gunpo-si, K. R., Papayan, G. V. 2007 U.S. Pat. No. 7,297,961 Fluorescence microscope and observation method using the same
Liao, C.-C. 2009 U.S. Pat. No. 7,599,122 Microscope optical system and digi a microscope having the same
Jacobs, A. 2006 U.S. Pat. No. 7,102,672. Integrated CMOS imaging array dark current monitor.
B. Herman 1998 Fluorescence Microscopy, 2nd ed, Oxford Unvie sity Press, 170 pp.
A. Diaspro 2011 Optical Fluorescence Microscopy From the Spectral to the Nano Dimension Springer-Verlag Berlin Heidelberg, SpringerLink http://dx.doi.org/10.1007/978-3-642-15175-0, last accessed Oct. 19, 2011
Heo, Y. S. and H. J. Song 2011 Characterizing cutaneous elastic fibers by eosin fluorescence detected by fluorescence microscopy. Ann Dermatol. 23: 44-52.
Martin, G., H. Agostini, L. Hansen. 2005 Light emitting diode microscope illumination for green fluorescent protein or fluorescein isothiocyanate epifluorescence. Biotechniques38:204-206.
Fossum, E. R. 1997 CMOS image sensors: electronic camera-on-a-chip. IEEE Trans Electron Devices 44:1689-1698.

Cheng, H.-Y.; King, Y.-C. A CMOS image sensor with dark-current cancellation and dynamic sensitivity operations. IEEE Trans Electron Devices 2003, 50, 91-95.

Saylor, J. and B. Cook. 2008 USB 3.0 specification now available: completed specification marks beginning of SuperSpeed USB product development. Nereus for USB-IF Press Release. San Jose, Calif.; accessed Nov. 17, 2008.

Hewlett-Packard Comp., Intel Corp., Microsoft Corp., and NEC Corp. 2008 ST-NXP Wireless; Texas Instruments. Universal Serial Bus 3.0 Specification.

Wang, C.-C. 2001 A study of CMOS technologies for image sensor applications. Thesis, Massachusetts Institute of Technology, 196 pp.

Burghartz, J. N., H.-Ci. Graf, C. Harendt, W. Klingler, H. Richter, and M. Strobel. 2006. HDR CMOS imagers and their applications. Proceedings of the International Conferences on Solid State and integrated Circuits Technology. 1:6-9.

Yang, D., H. Tian, B. Fowler, X. Liu, and A. El Gamal 2003 Characterization of CMOS image sensors with Nyquist rate pixel level ADC, in Selected Papers on CCD and CMOS Imagers, ed. M. G. Kang, SPIE Press. 664 pp.

What is claimed is:

1. An inverted fluorescence microscope, comprising:
   a stage positioned on a top, exterior surface of a housing of the inverted fluorescence microscope, wherein the stage is configured to allow placement of a sample for observation;
   an epifluorescence illumination and detection system whose light paths are contained entirely in a single mechanical structure, the epifluorescence illumination and detection system including an imager tube, wherein, during observation of the sample on the stage, the following components of the epifluorescence illumination and detection system including the imager tube are fixedly mounted relative to one another, so that an adjustment made, during observation of the sample on the stage, moves the entire epifluorescence illumination and detection system including the imager tube rather than the components individually a filter set, an objective lens, an image sensor, an epi-illumination system, and an optical imaging detection system,
   wherein the filter set is below the stage and comprises at least one excitation filter, a dichroic mirror, and an emission filter,
   wherein the objective lens is positioned between the stage and the filter set mounted to the imager tube,
   wherein the image sensor is positioned below the filter set,
   wherein the epi-illumination system is positioned below the stage and contained inside a filter tube mounted directly to the imager tube, wherein the epi-illumination system comprises at least one source of epi-illumination light, at least one condenser lens, the at least one excitation filter of the filter set; and the dichroic mirror, and
   wherein the optical imaging detection element is mounted to the imager tube and below the dichroic mirror of the filter tube, wherein the optical imaging detection element comprises the emission filter of the filter set, a projection lens, and the image sensor;
   a focusing assembly that attaches the imager tube to the stage; and
   a host computer comprising a program to control image acquisition from the image sensor.

2. The inverted fluorescence microscope of claim 1, wherein the stage comprises an x-y clamping caliper system for horizontal movement of the sample.

3. The inverted fluorescence microscope of claim 1, wherein the epifluorescence illumination and detection system lacks any apparatus such as a mirror, partial mirror, dichroic filter interposed in the path of light between the emission filter and the image sensor of the optical imaging detection element for any purpose such as of diverting or steering part of the light to one or more eyepieces or other physical, nonelectronic ocular element.

4. The inverted fluorescence microscope of claim 1, further comprising at least one sample cover to shield the stage from an outside light source or a stray light source.

5. The inverted fluorescence microscope of claim 4, wherein the sample cover can be displaced to expose the stage.

6. The inverted fluorescence microscope of claim 1, wherein the filter tube extends in a generally horizontal direction from the vertical optical axis set forth by the objective lens and the projection lens, wherein the epifluorescence illumination and detection system includes the imager tube, the filter tube, and an epi-illumination tube.

7. The inverted fluorescence microscope of claim 1, wherein the excitation filter provides non-vergent or vergent focus of the source of epi-illumination light on the sample.

8. The inverted fluorescence microscope of claim 1, wherein the at least one source of epi-illumination light, the at least one condenser lens, the at least one excitation filter, and the dichroic mirror are mounted in the filter tube as a generally horizontal extension from the imager tube to form a single optical axis for epi-illumination extending horizontally toward the dichroic mirror from the source of epi-illumination light, and light emitted from the source of epi-illumination light being directed to the stage by way of the dichroic mirror.

9. The inverted fluorescence microscope of claim 8, wherein the filter tube comprises an about 45 degree slanted end on which the dichroic mirror is directly mounted and centered at the vertical optical axis extending from the objective lens to the projection lens and that focuses at least one sample image on the image sensor, wherein along the optical axis the emission filter is provided between the dichroic mirror and the projection lens.

10. The inverted fluorescence microscope of claim 1, wherein the optical imaging detection system focuses at least one filtered image onto the image sensor.

11. The inverted fluorescence microscope of claim 1, wherein the optical imaging detection system is mounted to the imager tube extending in a generally vertical direction away from filter tube and focuses at least one filtered image of the sample onto the image sensor.

12. The inverted fluorescence microscope of claim 1, wherein in the focusing assembly, the field of view does not substantially shift during focusing and that variation of focus due to mechanical vibration is not substantially detectable.

13. The inverted fluorescence microscope of claim 1, wherein the source of epi-illumination light comprises at least one light-emitting diode (LED).

14. The inverted fluorescence microscope of claim 1, wherein the source of epi-illumination light comprises at least one laser diode.

15. The inverted fluorescence microscope of claim 1, wherein the program configures the image sensor to acquire at least one image.

16. The inverted fluorescence microscope of claim 1, wherein the program controls at least one image display by at least one computer from the image sensor.

17. The inverted fluorescence microscope of claim 1, wherein the image sensor detects multiple fluorescent emissions of differing wavelengths without manual, or automated changing, the light-filtering elements of the epifluorescence illumination and detection system during operation.

18. The inverted fluorescence microscope of claim 17, wherein the multiple fluorescent emissions are from different fluorescent labels in the sample.

19. The inverted fluorescence microscope of claim 1, wherein the excitation filter provides a plurality of wavelengths or range of wavelengths from the source of epi-illumination light.

20. The inverted fluorescence microscope of claim 1, wherein the dichroic mirror provides excitation light towards the sample and transmits emission light towards the image sensor.

21. The inverted fluorescence microscope of claim 1, wherein reflection of light by the dichroic mirror and transmission of light by the dichroic mirror and said emission filter results in isolated wavelengths from different fluorescent labels.

22. The inverted fluorescence microscope of claim 1, wherein the image sensor comprises a complementary metal oxide semiconductor array (CMOS).

23. The inverted fluorescence microscope of claim 22, wherein the CMOS controls acquisition of the sample image and processing of the image.

24. The inverted fluorescence microscope of claim 1, wherein the image sensor communicates with the host computer by way of at least one Universal Serial Bus (USB) bridge.

25. The inverted fluorescence microscope of claim 1, wherein the inverted fluorescence microscope detects multiple colors emitted from the sample without changing the filter set.

26. The inverted fluorescence microscope of claim 1, wherein the image is at least one single frame, at least one video, at least one time lapse image, or a combination thereof.

27. The inverted fluorescence microscope of claim 1, wherein the image is in black and white, grayscale, in color, or a combination thereof.

28. The inverted fluorescence microscope of claim 1, wherein the epi-fluorescence illumination and detection system is integral to the stage.

29. The inverted fluorescence microscope of claim 1, wherein the focusing assembly is attached to the stage by multiple points for mechanical stability.

30. The inverted fluorescence microscope of claim 1, wherein the source of epi-illumination light is controlled to deliver light in pulses in synchrony with the rate of frame output by the image sensor.

\* \* \* \* \*